(12) United States Patent
Kopp et al.

(10) Patent No.: US 7,727,394 B2
(45) Date of Patent: Jun. 1, 2010

(54) SYSTEM AND METHOD OF FLUID FILTRATION UTILIZING CROSS-FLOW CURRENTS

(75) Inventors: Clinton V. Kopp, Bismark, ND (US); Guanghua Yu, Rockaway, NJ (US); Chang-Wie Jen, Bedminster, NJ (US)

(73) Assignee: Dual Vortex Microfiltration, LLC, Champlin, MN (US)

( * ) Notice: Subject to any disclaimer, the term of this patent is extended or adjusted under 35 U.S.C. 154(b) by 501 days.

(21) Appl. No.: 11/554,577

(22) Filed: Oct. 30, 2006

(65) Prior Publication Data
US 2007/0163941 A1 Jul. 19, 2007

Related U.S. Application Data

(60) Provisional application No. 60/731,320, filed on Oct. 28, 2005.

(51) Int. Cl.
*B01D 63/00* (2006.01)
*B01D 61/00* (2006.01)

(52) U.S. Cl. .......................... 210/321.87; 210/321.72; 210/321.74; 210/321.88; 210/650; 210/652; 210/456

(58) Field of Classification Search .................. None
See application file for complete search history.

(56) References Cited

U.S. PATENT DOCUMENTS

| | | | | |
|---|---|---|---|---|
| 3,743,098 | A | * | 7/1973 | Martinez ............... 210/321.74 |
| 3,768,660 | A | * | 10/1973 | Block ..................... 210/321.87 |
| 5,405,528 | A | * | 4/1995 | Selbie et al. ................ 210/232 |
| 5,470,468 | A | | 11/1995 | Colby |
| 5,490,926 | A | * | 2/1996 | Hammeken ............ 210/321.74 |
| 5,628,909 | A | * | 5/1997 | Bellhouse .................... 210/650 |
| 6,461,513 | B1 | | 10/2002 | Jen |
| 7,122,071 | B1 | * | 10/2006 | Gonda et al. .................... 95/46 |
| 7,264,716 | B2 | * | 9/2007 | Johnson et al. ............. 210/232 |
| 2003/0141238 | A1 | * | 7/2003 | Herczeg ................ 210/321.87 |
| 2004/0197557 | A1 | | 10/2004 | Eshraghi et al. |
| 2004/0222156 | A1 | | 11/2004 | Yu et al. |
| 2005/0087767 | A1 | | 4/2005 | Fitzgerald et al. |

OTHER PUBLICATIONS

PCT/US06/60375 International Search Report, Sep. 10, 2008.

* cited by examiner

*Primary Examiner*—Krishnan S Menon
(74) *Attorney, Agent, or Firm*—Williamson Intellectual Property Law, LLC; Thomas R. Williamson, III

(57) ABSTRACT

A filter system and method of filtering a feed liquid utilizing a combined plurality of filter assemblies. Each filter assembly includes a filter housing, a filter cartridge and a spiral passageway for imparting secondary flow currents, particularly Dean-Flow currents, to fluid flowing within the spiral passageways to prevent particulate build-up on filter surfaces so as to extend filter life and duration between replacement. The filter system can be operated within positive or negative pressure filtration processes. A dual-stage filtration process utilizing a cap filter and a cylindrical depth filter is also disclosed.

28 Claims, 21 Drawing Sheets

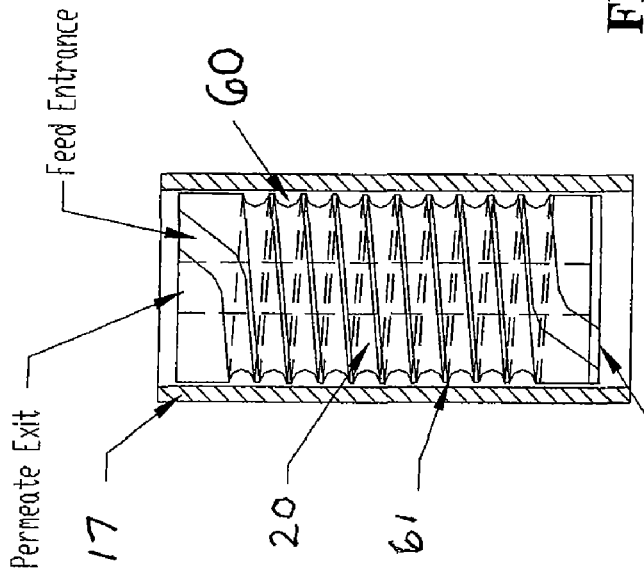
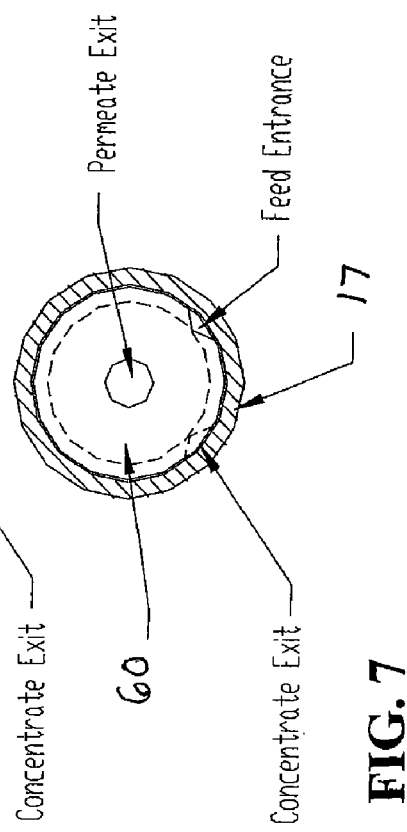
FIG. 6
FIG. 7

SYSTEM AND METHOD OF FLUID FILTRATION UTILIZING CROSS-FLOW CURRENTS

CROSS-REFERENCE TO RELATED APPLICATIONS

This application claims the benefit of U.S. Provisional Application No. 60/731,320, filed Oct. 28, 2005, said application being incorporated by reference herein.

TECHNICAL FIELD

The present invention relates to filter systems and more particularly to a filtration system combining cross-flow currents and secondary flow currents such as Dean-Flow currents to assist in surface cleaning of the filter cartridge.

BACKGROUND OF THE INVENTION

In a typical fluid filtration application, cylindrical depth filters are housed within pressure vessels. During the filtration process the vessel is pressurized to force the fluid through the depth filter media. As the fluid flows through the filter, particles are trapped by the fibers that make up the depth filter media. The fluid that has been filtered (the "filtrate") is then forced from the filter housing by the pressure within the vessel.

FIG. 23 illustrates a known filtration device consisting of a cylindrical filter cartridge 231 containing a cylindrical case 233 which has an inlet 234 and an outlet 235. The fluid being filtered enters the inlet and flows through the filter 231, which removes and retains larger particles passing through openings of the filter, but allows the carrier fluid (the filtrate) to pass through and exit via the outlet 235. The effective filtering area of this device is larger than the inlet area. Thus, the speed of flow through the filter is slower than that in the inlet, and the direction of the flow through the filter 231 is perpendicular to the surface of the filter. This situation results in formation of a cake layer blocking openings of the filter, whereby the effective filtration area is reduced. When the effective area of the filter becomes smaller than the inlet area, the effective pressure (ΔP) between inlet 234 and outlet 235 increases. For typical applications, there is a maximum pressure drop allowed for the filtration device. FIG. 24 shows the relationship of operation time against pressure drop across filtration devices of the prior art. At the beginning of a filtration operation, the pressure drop is generally constant as long as the effective filtration area is larger than the cross sectional area of the inlet 234. The effective filtration area will gradually be reduced due to formation of a cake layer on the filter. When the effective filtration area becomes smaller than the cross sectional area of the inlet 234, the pressure drop across the filter device will suddenly increase, and quickly exceed the maximum value of the device.

As the cylindrical filter cartridge 231 becomes clogged with particles, the overall performance of the filter system decreases. To a minimal extent, cartridge filters can be cleaned by mechanical and/or fluid agitation. As a result, one significant limitation of a cartridge filter is a relatively short usable life, particularly in applications having high particle counts.

A need exists for a filtration system which can minimize the effects of pressure drop across a filter media. This is also a need for a self-cleaning filter assembly providing improved surface cleaning capabilities.

SUMMARY OF THE INVENTION

The present invention is directed to a filter system utilizing a cross flow filtration assembly which develops secondary flow currents in a fluid flowing in a spiral flowpath about filter cartridges. Desirably the secondary flow currents developed by the spiral flowpath are Dean-Flow currents. Dean-Flow currents describe a particular flow regime developed for a spiraling fluid flowpath when fluid is forced therethrough at a critical flow velocity. FIG. 25 illustrates Dean-Flow currents established around a filter cartridge within a filter housing having spiral guides. Dean-Flow currents are developed in opposing pairs of corkscrew vortices which travel along the spiral fluid flowpath and provide a shear cleaning current across the filter media surface so as to conduct away particles entrapped by the filter media. Fluid flowing through a spiral flowpath at less than the Dean-Flow critical velocity will not develop the opposing corkscrew currents therein while fluid flowing too quickly through a spiral flowpath degenerates into a purely turbulent flow regime. Dean-Flow currents have been demonstrated to better maintain the flux rate across a filter media so as to extend the operating period of a filter unit between required backflushing or maintenance.

One embodiment of the present invention provides a filtration assembly including a plurality of filter housings each having an elongate housing wall having opposed first and second open ends and an elongate cylindrical interior surface defining a housing cavity. The filter housing further defines an input feed port, a permeate output port, and a retentate output port, all in fluid communication with the housing cavity. An elongate porous filter is mounted within the housing cavity. In one embodiment, the filter defines an open first end, an opposed closed second end, and an elongate cylindrical permeate passageway extending therebetween. The permeate passageway extends in fluid communication with the permeate output port through the first open end of the filter. The filter includes a substantially cylindrical outer filter surface, wherein the outer filter surface and the interior surface of the housing wall define an elongate annular gap therebetween.

In one embodiment, a spiral guide extends through the annular gap between the outer filter surface and the interior surface of the housing wall so as to define a fluid flow passage extending between the input feed port and the retentate output port. In another embodiment, a spiral guide is defined by a spiral contour on an outer surface of the filter and the housing wall is without a spiral guide. In each embodiment, fluid enters the filter assembly through an input feed port and is either drawn or forced into the spiral fluid flow passage along said filter. The pitch and width of the spirals define a cross-sectional area for the fluid flow passage which, for the velocity of the fluid flowing therethrough, induces secondary flow currents in the fluid as it travels along the spiral fluid flow passage.

The present invention contemplates a filter system employing a number of such cross-flow filtration assemblies. One such filter system includes an elongate cylindrical filter housing having an interior cylindrical wall defining an elongate filter cavity, a feed inlet in fluid communication with the filter cavity, and a retentate outlet port in fluid communication with the filter cavity. An elongate cylindrical filter cartridge supported in the filter housing includes an elongate porous cylindrical filter wall having an elongate cylindrical outer filter surface and an elongate inner filter surface defining a permeate passageway. A spiral fluid guide spans between the interior cylindrical wall of the filter housing and the outer filter surface. The spiral guide defines a spiral fluid passageway extending between the feed inlet and the retentate outlet port.

The spiral fluid passageway imparts a secondary flow current to fluid flowing therethrough. The spiral fluid passageway may be of dimension so as to impart Dean-Flow currents to fluid flowing therethrough.

A method of filtering particles from a fluid is also disclosed. The method includes providing a filtration system having a plurality of filtration assemblies, each having an interior cylindrical filter, an outer filter housing concentrically supported about the interior cylindrical filter so as to define an annular fluid cavity therebetween, and a spiral guide spanning between the filter and the housing so as to define a spiral fluid passageway generally from one end of the filter to the opposed end of the filter. The method then includes passing a feed fluid having particulate matter suspended therein through the fluid passageway at a velocity sufficient to induce secondary flow currents in the fluid so as to provide a shear cleansing current across the filter. The induced secondary flow currents preferably take the form of Dean-Flow currents.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 6 illustrates a cross sectional view of another embodiment of a filter housing and filter cartridge suitable for use within an embodiment of the present invention;

FIG. 7 is a top plan view of the filter housing and cartridge of FIG. 6;

FIG. 10b is a cross sectional view of the filter assembly taken along lines b-b of FIG. 10a;

DETAILED DESCRIPTION OF THE INVENTION

Figure 1:
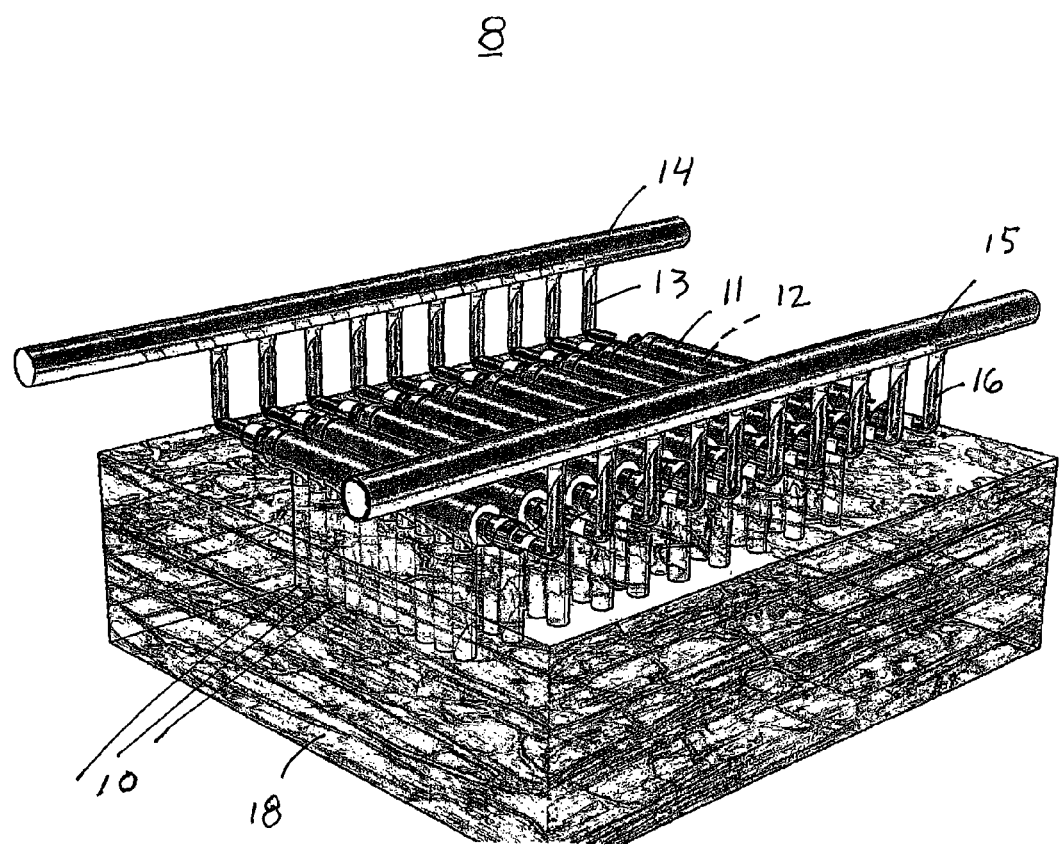
FIG. 1 is a perspective illustration of a portion of a filter system embodiment the present invention.

Embodiments of the present invention thereby provide a filter system having applications in reverse osmosis, nano-filtration, ultra-filtration, micro-filtration, and screen mesh, or particle, filtration applications.

One embodiment of the present invention provides a filtration system having a plurality of filter housings containing a plurality of cylindrical depth filters. The housings define modular assemblies which are provided in fluid communication via a manifold assembly. A filtration assembly according to the present invention may contain a plurality of modular filter housings interconnected via the manifold assembly and/or an external frame.

In one embodiment of the invention the filter housings include internal structure, such as channels, suitable to establish Dean-Flow currents between the housing and the filter media. Dean-Flow currents describe a particular flow regime developed for a spiraling fluid flow path when fluid is forced therethrough at a critical flow velocity, as disclosed in U.S. Pat. No. 6,461,513, herein incorporated by reference in its entirety.

Dean-Flow currents are developed in opposing pairs of corkscrew vortices which travel along the spiral fluid flow path and provide a shear cleaning current across the filter media surface so as to conduct away particles entrapped by the filter media. Fluid flowing through a spiral flow path at less than the Dean-Flow critical velocity will not develop the opposing corkscrew currents therein while fluid flowing too quickly through a spiral flow path degenerates into a purely turbulent flow regime. Dean-Flow currents have been demonstrated to better maintain the flux rate across a filter media so as to extend the operating period of a filter unit between required back flushing or maintenance.

An embodiment of the present invention provides a filtration system including a plurality of filters each having a filter cartridge mounted within a housing. Each filter housing further defines an input feed port, a permeate output port, and a retentate output port, all in fluid communication with the housing cavity. An elongate porous filter is mounted within the housing cavity. The filter defines an open first end, an opposed closed second end, and an elongate cylindrical permeate passageway extending therebetween. The permeate passageway extends in fluid communication with the permeate output port through the first open end of the filter. The filter includes a substantially cylindrical outer filter surface, wherein the outer filter surface and the interior surface of the housing wall define an elongate annular gap therebetween. A spiral guide extends through the annular gap between the outer filter surface and the interior surface of the housing wall so as to define a fluid flow passage extending between the input feed port and the retentate output port. Fluid enters the filter assembly through the input feed port and into the fluid flow passage substantially along a tangential flow path along said filter. The pitch and width of the spiral define a cross-sectional area for the fluid flow passage which, for the velocity of the fluid flowing therethrough, induces secondary flow currents in the fluid as it travels along the spiral fluid flow passage. Desirably, the filter unit develops Dean-Flow currents through the spiral fluid flow passage.

The movement of these vortices creates micro-backwashing events that continually move across the filter surface, allowing the filter to operate essentially indefinitely without plugging (i.e. these backwashing events continuously clean the filter surface). Because very little energy is lost in the creation and maintenance of these vortices, embodiments of a filtration system of the present invention can operate at low pressures (5-12 psi). Embodiments of the present invention thus provide for filtration using an efficient, low-energy process.

The present invention is also directed to a method of filtering particles from a fluid. One method includes providing a filtration assembly having a plurality of cylindrical filters, a plurality of outer filter housings defining annular fluid cavities, and a plurality of spiral guide spanning between the filter and the housing so as to define a spiral fluid passageway from one end of the filter to the opposed end of the filter. This method then includes forcing a feed fluid having particulate matter suspended therein through the fluid passageway at a velocity sufficient to induce secondary flow currents in the fluid so as to provide a shear cleansing current across the filter. The induced secondary flow currents may take the form of Dean-Flow currents. Fluid may be forced through the filter housing under positive or negative pressure.

Some embodiments of the present invention rely on negative pressure (pressure less than atmospheric pressure) to drive the filtration process. By eliminating the requirement of positive pressure vessels, the capital cost of the filtration process can be reduced.

In one embodiment, negative pressures can be used to create the Dean-Flow vortices around the filter cartridges. In one embodiment, two pressure drops are developed during the filtration process, the pressure drop across the depth filter and the pressure drop that drives the spiral cross-flow of water across the filters surface. Two pumps can be utilized in this process. Centrifugal pumps are one type of pump suitable for an application of the present invention. One pump can pulls water through the depth filter (for example, at −5 psi to −12 psi) and another pump pulls the feed water through the spiral channels in the shell creating dual vortices that move across the filter surface (for example, at −3 to −6 psi.). As the feed stream moves across the filter surface, water flows through the filter. For every gallon that enters the filter 70% to 80% is filtered and 20% to 30% leaves unfiltered. This unfiltered concentrate can be furthered concentrated and returned for subsequent filtering or discharge as no chemicals are used in one separation process.

The negative pressure filtration system may be operated in an open tank with feed fluid being pulled through the filter from the open tank, such as depicted in FIG. 1. The filter may be occasionally backwashed by reversing the filtrate pressure (the filtrate pressure changes to positive from negative) to dislodge and remove accumulated particles from the depth filter By utilizing two pumps to control filtration rate and flow across the filter surface, the pressures on each side of the filter can be easily controlled. The control of pressure differences across the filter is essential in controlling the rate of solids accumulation within the depth filter. Too high of pressure across the filter will push solids deep into the filter, thus making the particles more difficult to remove during the backwashing process.

The filtration performance of a filter can be at least partially restored by reversing the pressures across the filter (backwashing the filter). A filter backwash may occur while Dean-Flow vortices move across the surface of the filter. This combination of backwash and Dean-Flow vortices is highly effective in removing solids that have accumulated within the depth filter.

The rate of filter plugging can also be significantly reduced by varying the pressures across the filter, while Dean-Flow vortices move across the filter's surface. If the pressure across the filter is temporally reduced, the Dean-Flow vortices are more effective in pulling particles from the filter if the flow through the filter is reduced.

The efficiency of the filter backwash may be improved by introducing gas to the filtrate during the backwashing process. The introduction of a gas (air) increases the energy of the backwash and presents hydrophobic/hydrophilic interfaces that assist in dislodging and removing particles from the filter. Pulsing of the backwash gas provides additional energy for particle dislodging and removal.

The filter cartridges of at least some of the embodiments of the present invention may be partially clean by inducing a back pressure or back wash to drive particles away from the cartridge center. The back pressure can be established by a positive or negative pressure provided, for example, by a pump or pumps. The back pressure can be intermittently applied, for example, by a pump or pumps. The back pressure can be intermittently applied, for example by one or more valves and a controller, in order to occasionally back flush the cartridge during a maintenance mode of operation. It should be appreciated that a variety of different approaches can be utilized to create a back pressure across the filter media during a maintenance procedure. Additionally, for low ΔP conditions, the backwash can be established by Dean-Flow currents. The Dean-Flow currents may be established intermittently in order to maintain the filter. The back pressure can be intermittently applied as pressure pulses. The length and duration of the pressure pulses could be optimized for a particular filter application.

FIG. 1 illustrates an embodiment of a negative pressure filtration system of the present invention, indicated as numeral 8. System 8 includes a plurality of filter assemblies 10, a plurality of concentrate manifolds 11, and a plurality of permeate manifolds 12. Concentrate manifolds 11 are in fluid communication with concentrate line 14 via conduits 13.

Figure 2:
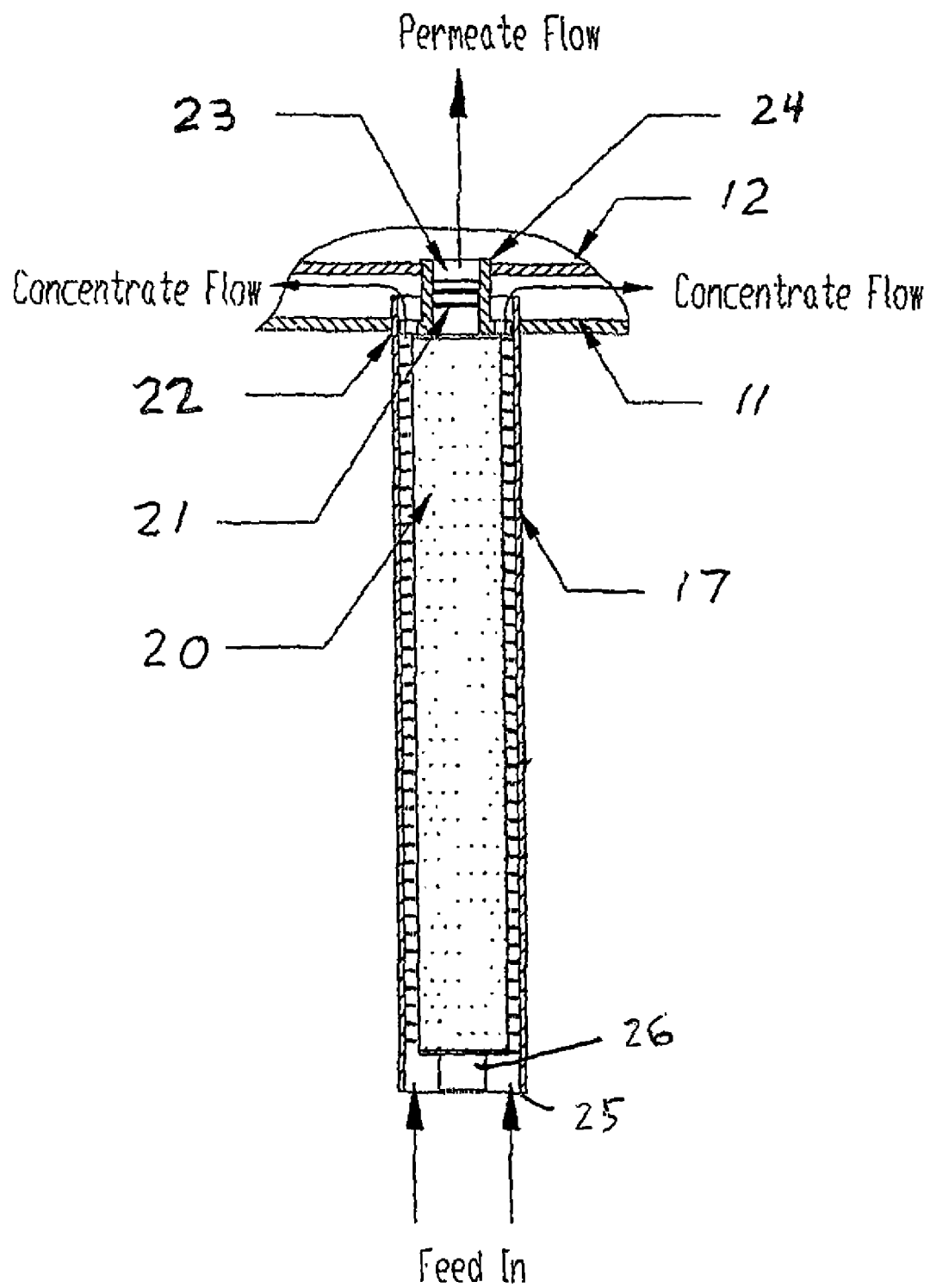
FIG. 2 is illustrates a filter assembly utilized in the filter system of FIG. 1.

Permeate manifolds 12 are in fluid communication with permeate line 15 via conduits 16. Concentrate manifolds 11 and permeate manifolds 12 are in fluid communication with filter cartridges 20 held within filter housings 17. Filter housings 17 are at least partially submerged in a feed liquid 18 to be filtered. As shown in FIG. 2, feed liquid is drawn into a lower opening in filter housing 17, spirals upwardly around channels formed within housing 17, and enters concentrate manifold 11 for subsequent distribution. Some of the feed liquid is filtered (permeate) by passing through a filter media of cartridge 20 to an inner passageway and then upwardly into permeate manifold 12 for subsequent distribution.

FIG. 2 illustrates an embodiment of filter assembly 10 suitable for use with filter system 8 of FIG. 1. One end of filter housing 17 is connected to concentrate manifold 11. An adhesive 22 or mechanical fit can be used to connect housing 17 to manifold 11. An interior of filter cartridge 20 is in fluid communication with permeate manifold 12 via permeate reception adapter 23. An adhesive 24 may be used to connect adapter 23 to permeate manifold 12. Alternatively, adapter 23 can be permanently connected to cartridge 20 and replaced during cartridge 20 exchange. Seal rings 21 prevent cross-contamination between concentrate flow and permeate flow. Housing 17 defines a feed inlet 25 through which feed liquid is introduced into filter housing 17. Dean-Flow currents are established around the external surface of filter cartridge 20 as feed liquid (concentrate) circulates upwardly toward concentrate manifold 11. Cap 26 blocks fluid from entering the end of filter cartridge 20.

Figure 3:
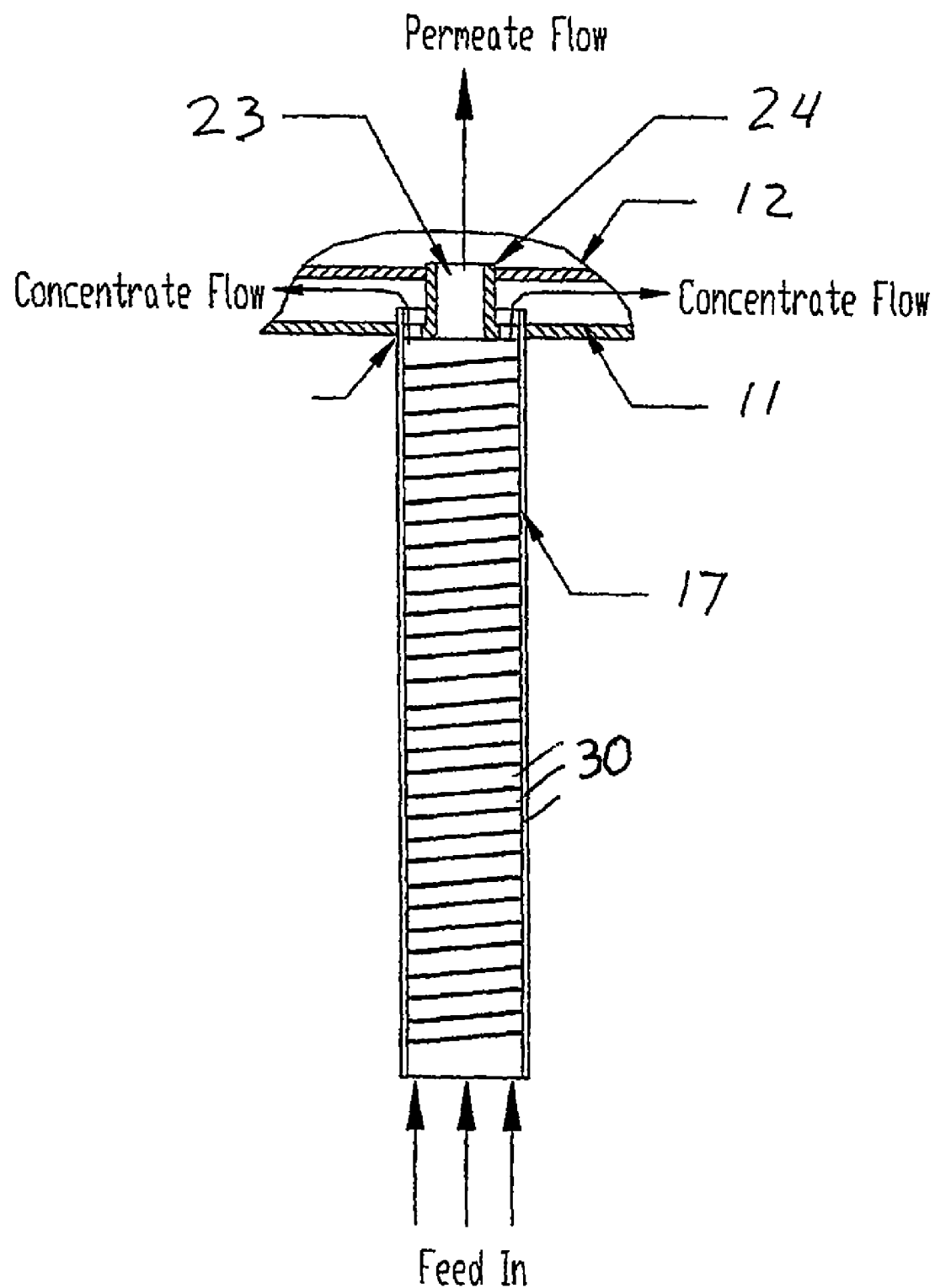
FIG. 3 illustrates the filter assembly of FIG. 2 with the filter cartridge removed.

FIG. 3 illustrates the filter assembly 10 of FIG. 2 with filter cartridge 20 removed. Spiral channel or groove 30 is shown in this figure.

Figure 5:
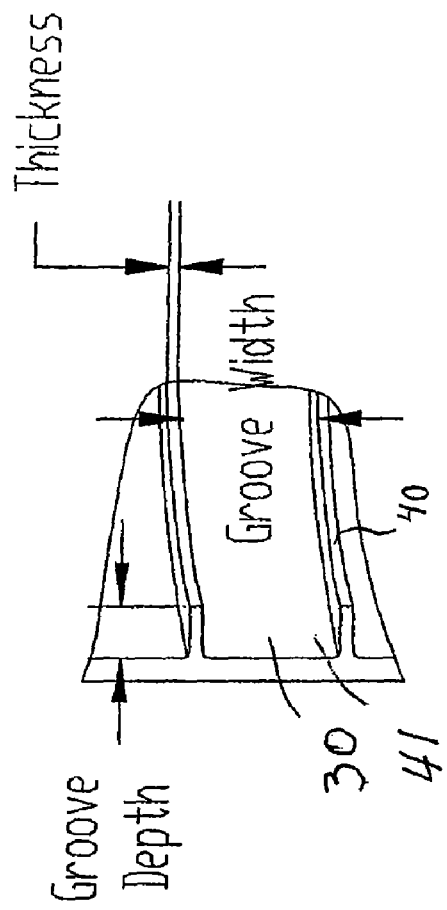
FIG. 5 illustrates a detailed portion of FIG. 4.
Figure 4:
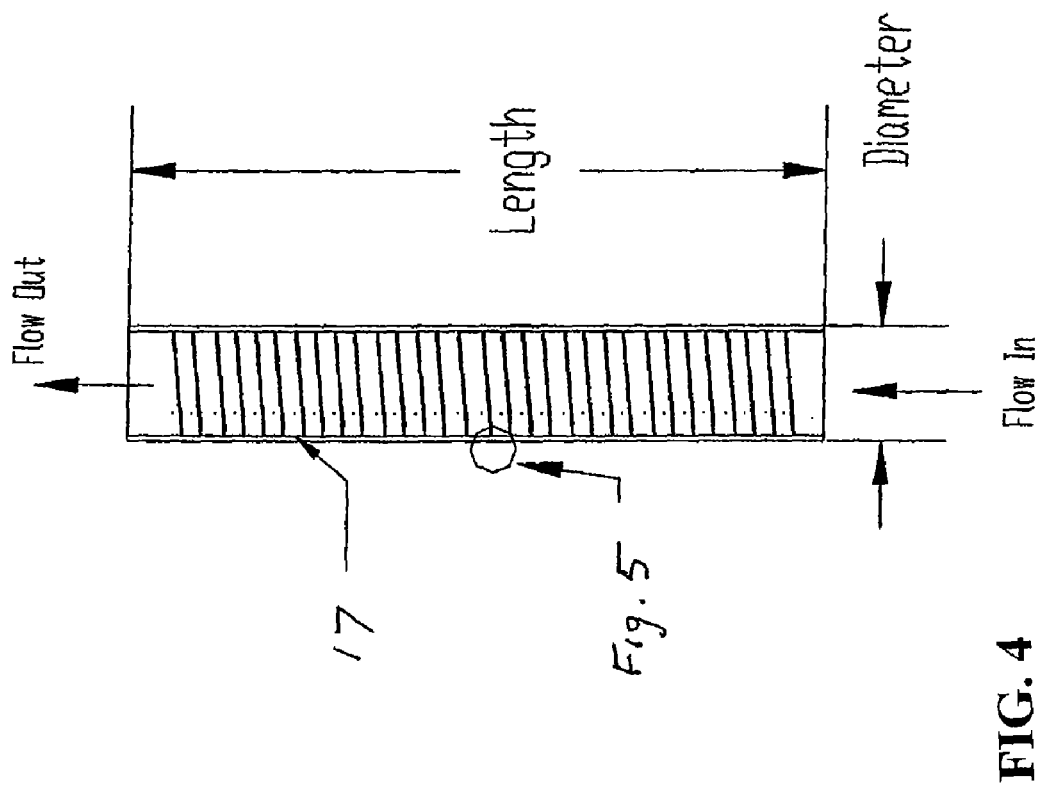
FIG. 4 illustrates a cross-sectional view of a filter housing of the filter assembly of FIG. 2.

FIGS. 4 and 5 illustrates filter housing 17 with a spiral guide channel 30 formed by channel walls 40 extending inwardly from a base surface 41 toward a center axis of housing 17. The length, thickness, width and depth of channel walls 40, along with the overall length and diameter of housing 17, may be varied depending on the filtration system application in order to establish Dean-Flow currents.

In comparison, FIGS. 6 and 7 illustrate another embodiment of filter housing 17 and filter cartridge 20 wherein spiral contours 60 of cartridge 20 define channels utilized to form Dean-Flow Currents along the exterior of cartridge 20. Contours 60 are show as generally semi-circular grooves within the filter media. A gap 61 is defined between the apexes of contours 60 and inner wall of housing 17. In one embodiment of filter assembly 10, gap 61 may range from approximately 0.00" to 0.5". While contour 60 is shown with a generally semi-circular cross section, alternative shapes and sizes may be practicable to establish Dean-Flow currents around filter cartridge 20.

Figure 8:
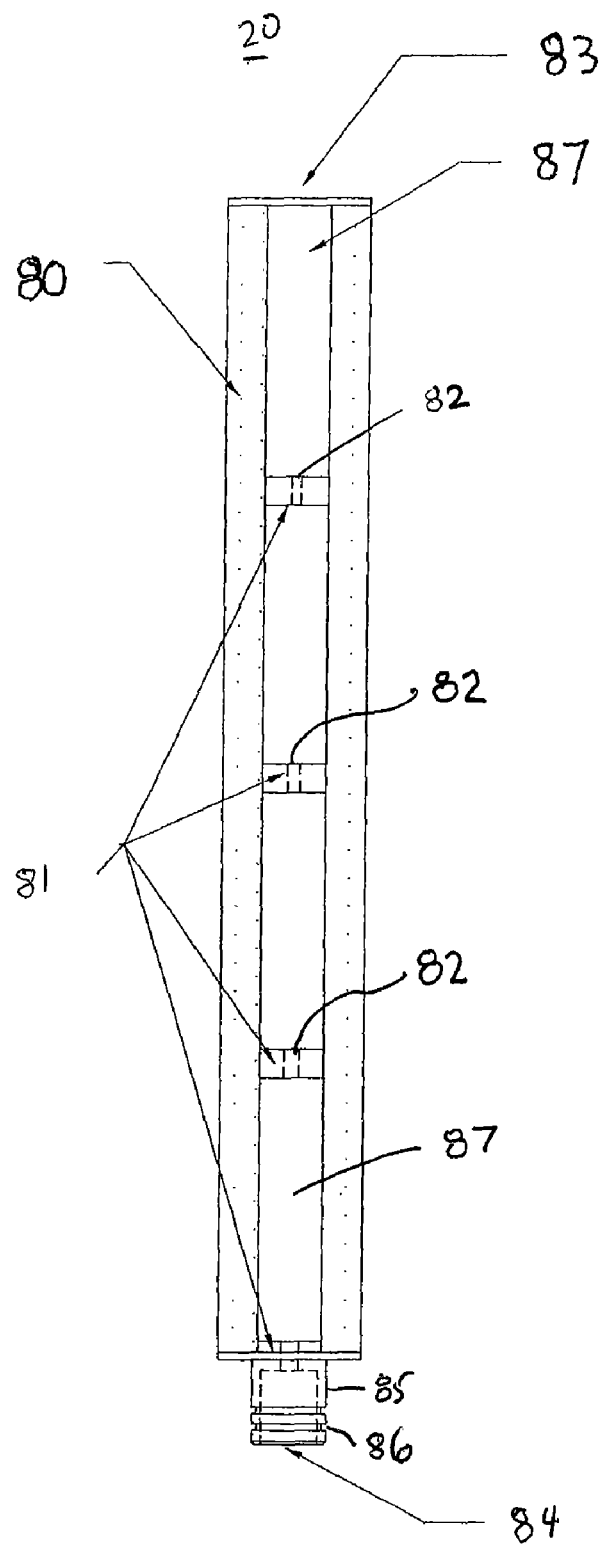
FIG. 8 is a cross sectional view of a filter cartridge suitable for use with an embodiment of the present invention.
Figure 9:
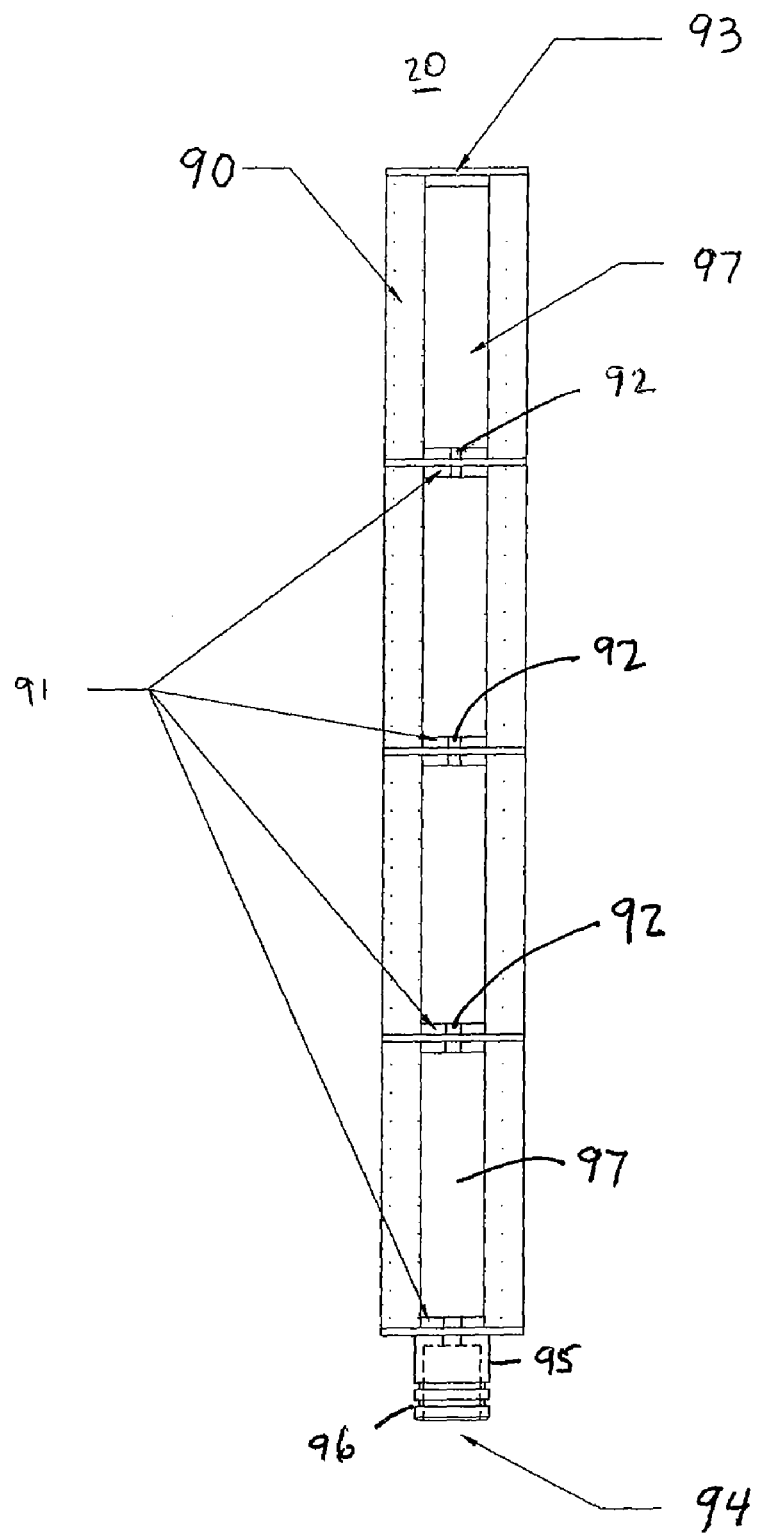
FIG. 9 is a cross sectional view of a filter cartridge suitable for use with an embodiment of the present invention.

FIGS. 8 and 9 show alternative embodiments of filter cartridge 20. Cartridges 20 of FIGS. 8 and 9 include filter media 80, 90 and a plurality of flow resistors 81, 91 for limiting the flow of filtrate through the interior passageways of cartridge 20. Resistors 81, 91 each have open passages 82, 92 permitting fluid flow between inner passageways of cartridge 20. Passages 82, 92 of resistors 81, 91 are sized to equalize the local pressure differentials along the length of cartridge 20 (between end plates 83, 93 and filtrate outlets 84, 94). Filtrate outlets 84, 94 are defined within couplers 85, 95 used to connect cartridge 20 into filter assembly 10. Couplers 85, 95 have grooves 86, 96 which receive o-rings (not shown) to seal against cross-contamination during a fluid filtration process, i.e., filtered fluid from inner passageways 87, 97 is not commingled with concentrate. A variety of other sealing approaches may also be practicable to prevent or minimize fluid cross-contamination.

Figure 10A:
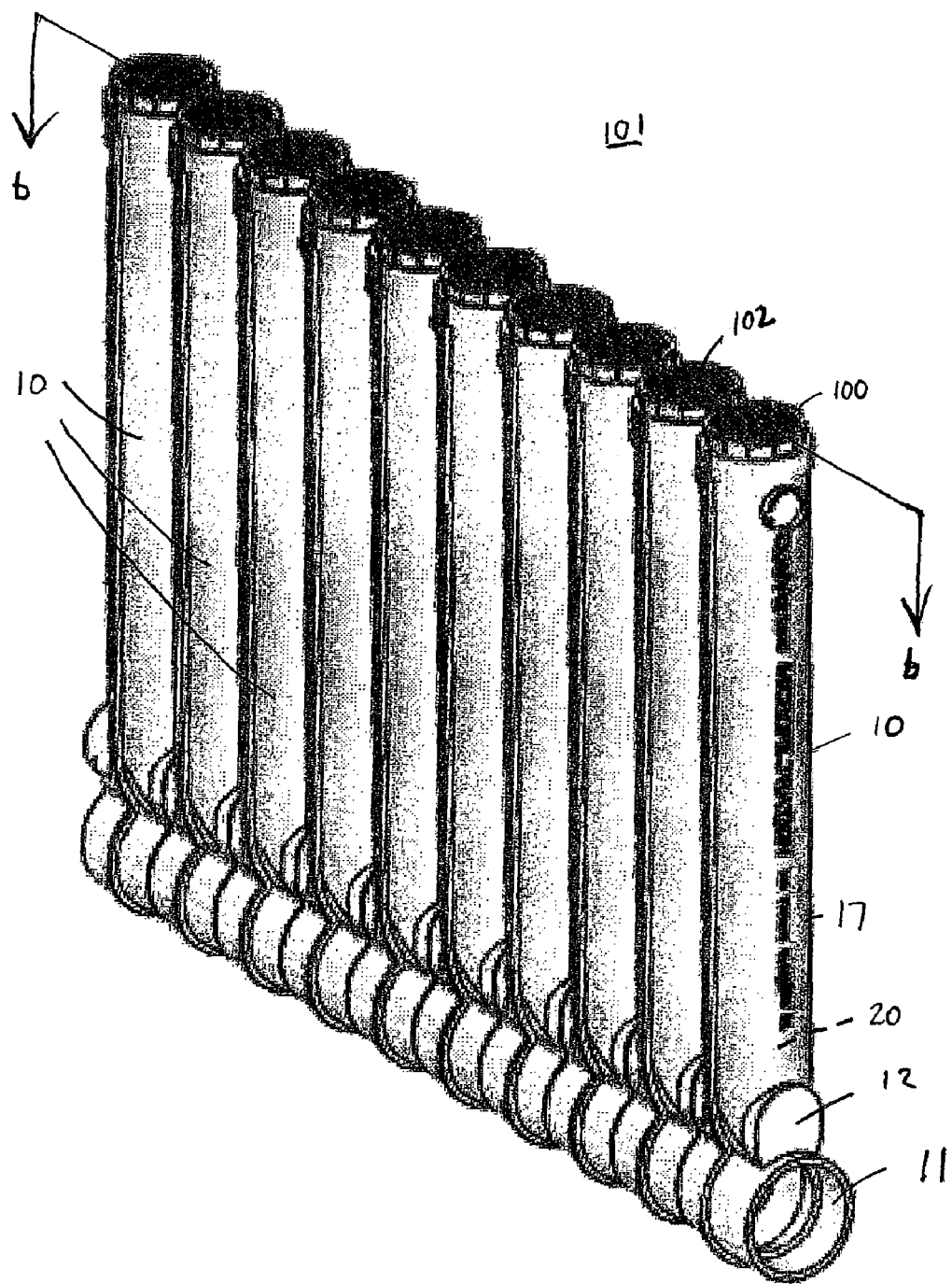
FIG. 10a is a perspective view of another embodiment of a filter assembly suitable for use with a filter system embodiment of the present invention.
Figure 10B:
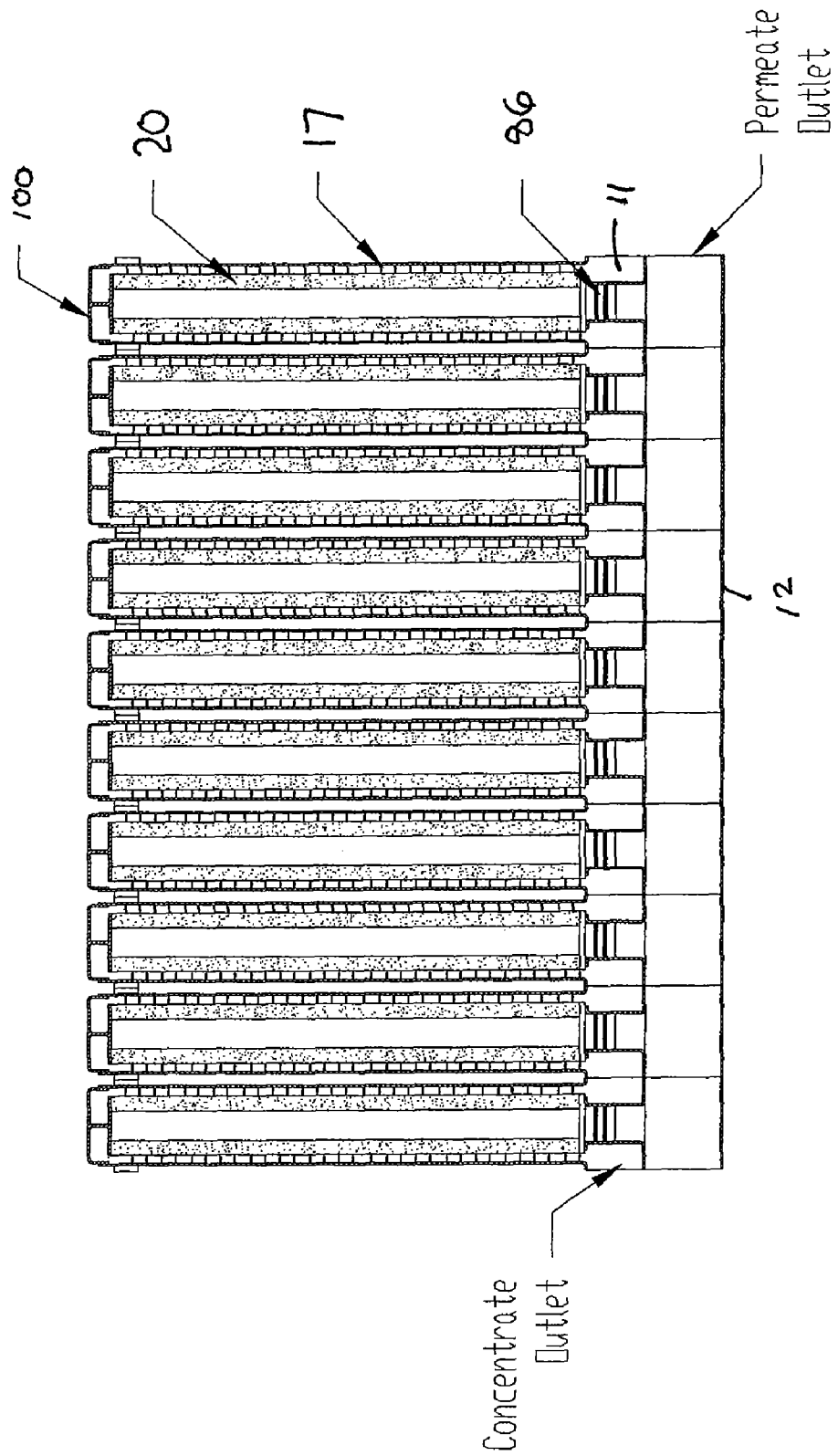

FIG. 10*a* illustrates another negative pressure filter embodiment 101 having a plurality of filter assemblies 10. Filter assemblies 10 are coupled to concentrate manifold 11 and permeate manifold 12. As shown in FIG. 10*b*, concentrate manifold 11 and permeate manifold 12 are generally parallel, but not concentric. At an opposite end, filter assemblies 10 each include a filter cap 100 having a plurality of apertures 102 sized to provide initial gross filtering of feed liquid to be filtered. For example, apertures 102 of cap 100 approximately 5 mm in diameter so that together cap 100 and cartridge 17 can remove particles ranging from about 6 mm to 0.3 microns.

FIG. 10*b* is a cross-sectional view of embodiment 101 taken along lines 11-11 of FIG. 10*a*. In the illustrated embodiment, cap 100 and filter cartridge 20 are permanently connected and are replaced together during a routine cartridge 20 exchange procedure. Cap 100 may be mechanically connected to filter housing 17, such as with a threaded fastening structure. For example, cap 100 may include fastening structure similar to a common automobile gas tank cap. In other example, cap 100 may be connected to housing 17 with a friction fit.

Figure 11:
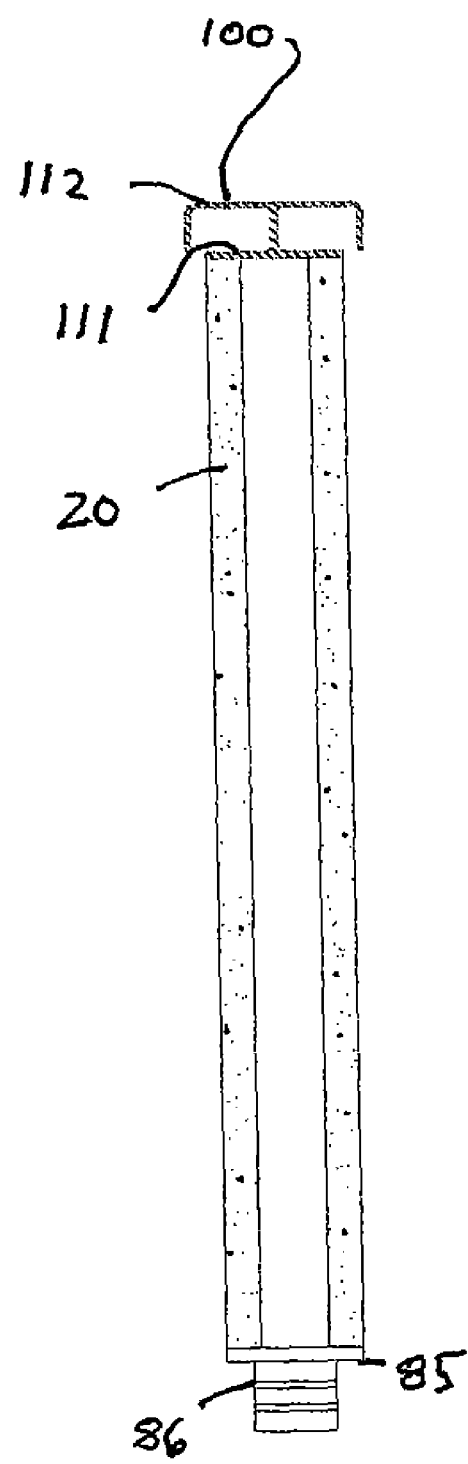
FIG. 11 is a cross section view of another embodiment of a filter cartridge.

FIG. 11 is a cross-sectional view of a filter cartridge 20 incorporating cap 100 and filter cartridge 20. Cap 10 may be adhesively secured at an end of cartridge 20. Cap 100 includes a non-porous portion 111 which block fluid flow into the cartridge 20 inner passageway and includes an apertured portion 112 having a plurality of apertures providing gross filtering of the feed fluid. In one embodiment of cap 100, apertures are sized from 1/16" to 1/8" in diameter. Other sizes and shapes of apertures would also be practicable.

Figure 12:
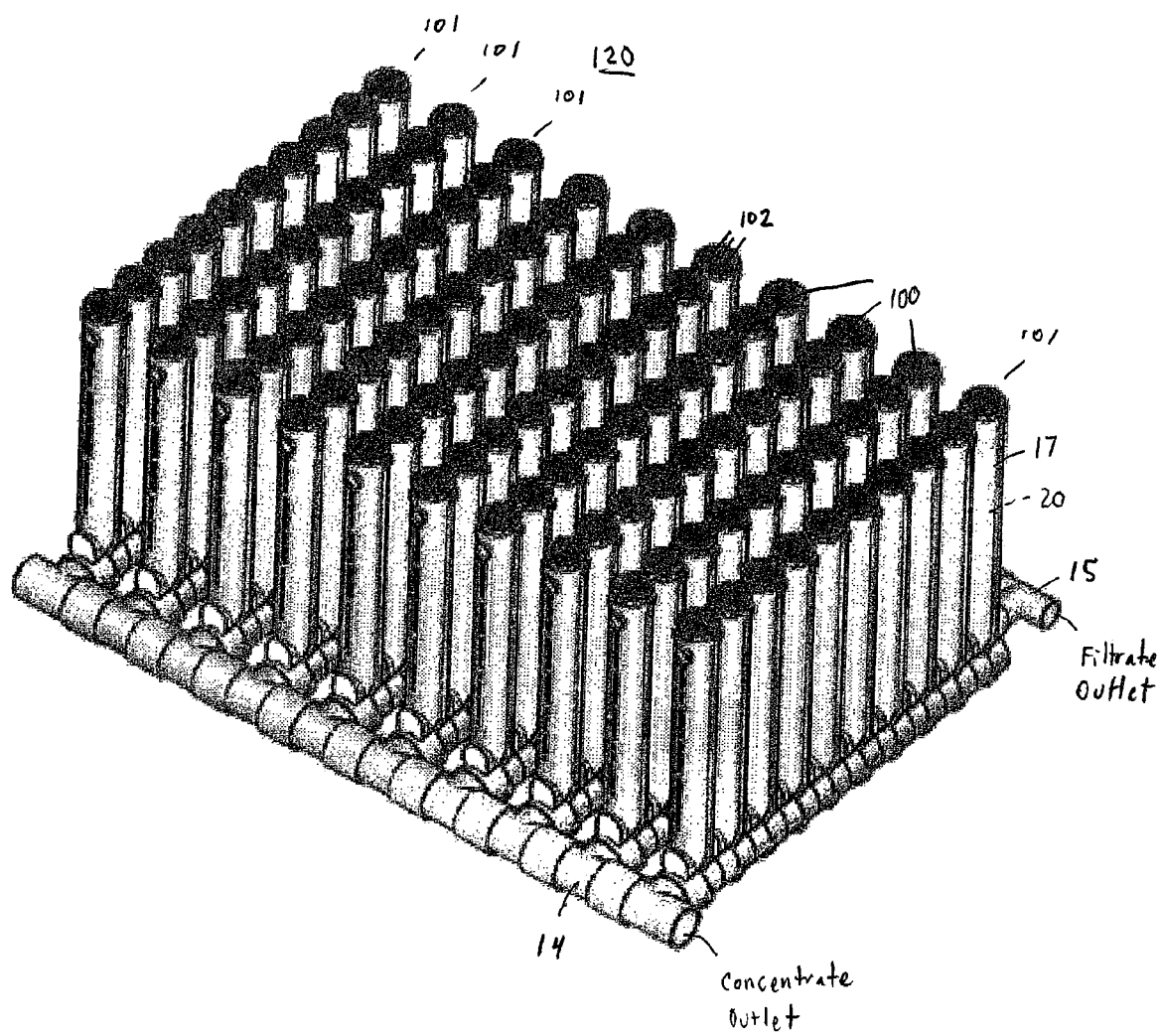
FIG. 12 is a perspective illustration of a filter system utilizing multiple filter assemblies in accordance with the present invention.

FIG. 12 illustrates an embodiment 120 having a plurality of filter units 101 of FIG. 10*a*. Filter units 101 are coupled between concentrate line 14 and filtrate line 15. Lines 14, 15 are coupled to other lines (not shown) to transport the filtrate and concentrate out of the feed liquid tank. As described above, a filtration system would typically utilize one or more pumps, valves, controllers, etc. to control fluid flow through filter assemblies 10 during both a filtration procedure and a back-wash procedure.

Liquid to be filtered enters filter assemblies 10 through apertures 102 of caps 100. Embodiment 120 is adapted to be submerged within a tank of feed water. Cartridges 20 can be replaced by lowering the feed liquid level to expose the upper ends of filter housings 17, allowing caps 100 and cartridges 20 to be replaced.

Filtration system embodiment 120 of FIG. 12 may be supported upon a floor of a feed liquid tank or may be held on a frame (not shown) within the tank. Filtration system embodiment 120 may be coupled together with similar systems to create a large filtration system. For example, hundreds of filter assemblies 10 may be utilized within a large tank of feed liquid and, for example, with a cat walk providing access to the filter cartridges 20 during exchange, etc. For example, the feed water may be lowered to provide overhead access to the filter assemblies to exchange filter cartridges 20.

Figure 13:
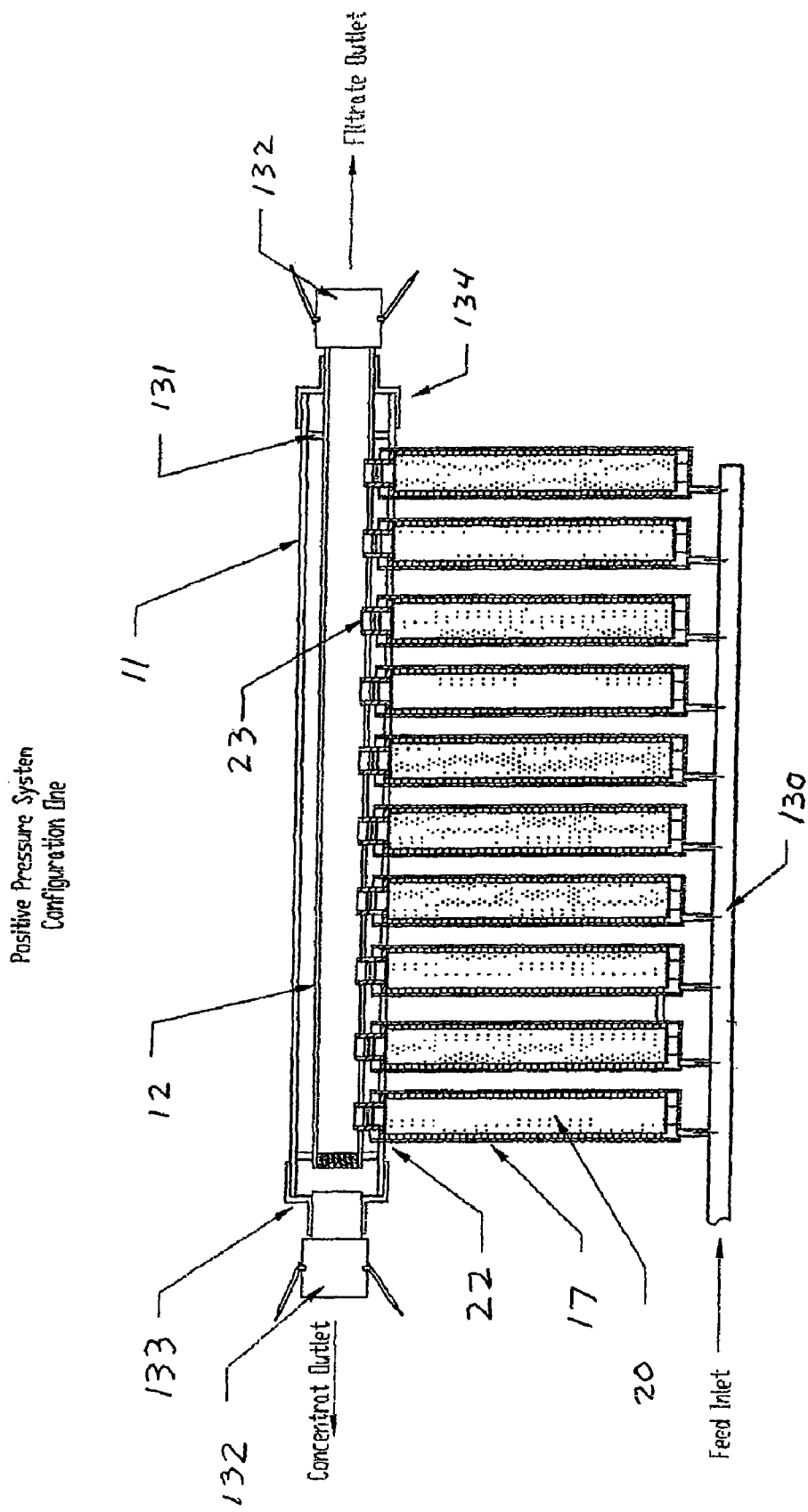
FIG. 13 is a side view illustration of a positive pressure filter system in accordance with the present invention.

FIG. 12 illustrates a negative pressure system for filtering a feed liquid. In comparison, FIG. 13 illustrates a positive pressure filtration subsystem having a plurality of filter units including a plurality of filter housings 17 and filter cartridges 20. Feed inlet manifold 130 is in fluid communication with each filter housing through lines connected at a lower end of filter housing 17. In this example, permeate manifold 12 and concentrate manifold 11 are concentrically aligned. Permeate manifold 12 is capped at one end to prevent cross-contamination of permeate with concentrate. A pair of permeate manifold supports 131 maintain permeate manifold 12 within concentrate manifold 11. A pair of adapters 133, 134 provide transitions between permeate manifold 12 and filtrate and concentrate outlets. A pair of quick connect couples 132 may be utilized to facilitate connection of the subassembly of FIG. 13 into a filtration system. Pressures within feed manifold 130, permeate manifold 12 and concentrate manifold 11 can be controlled to establish Dean-Flow currents within filter housings 17 or temporary back-flows through cartridges 20 during a cleaning process. During a filtration process, fluid to be filter enters feed inlet manifold 13, filtrate exits permeate manifold 12 and concentrate exits concentrate outlet 11.

Figure 14:
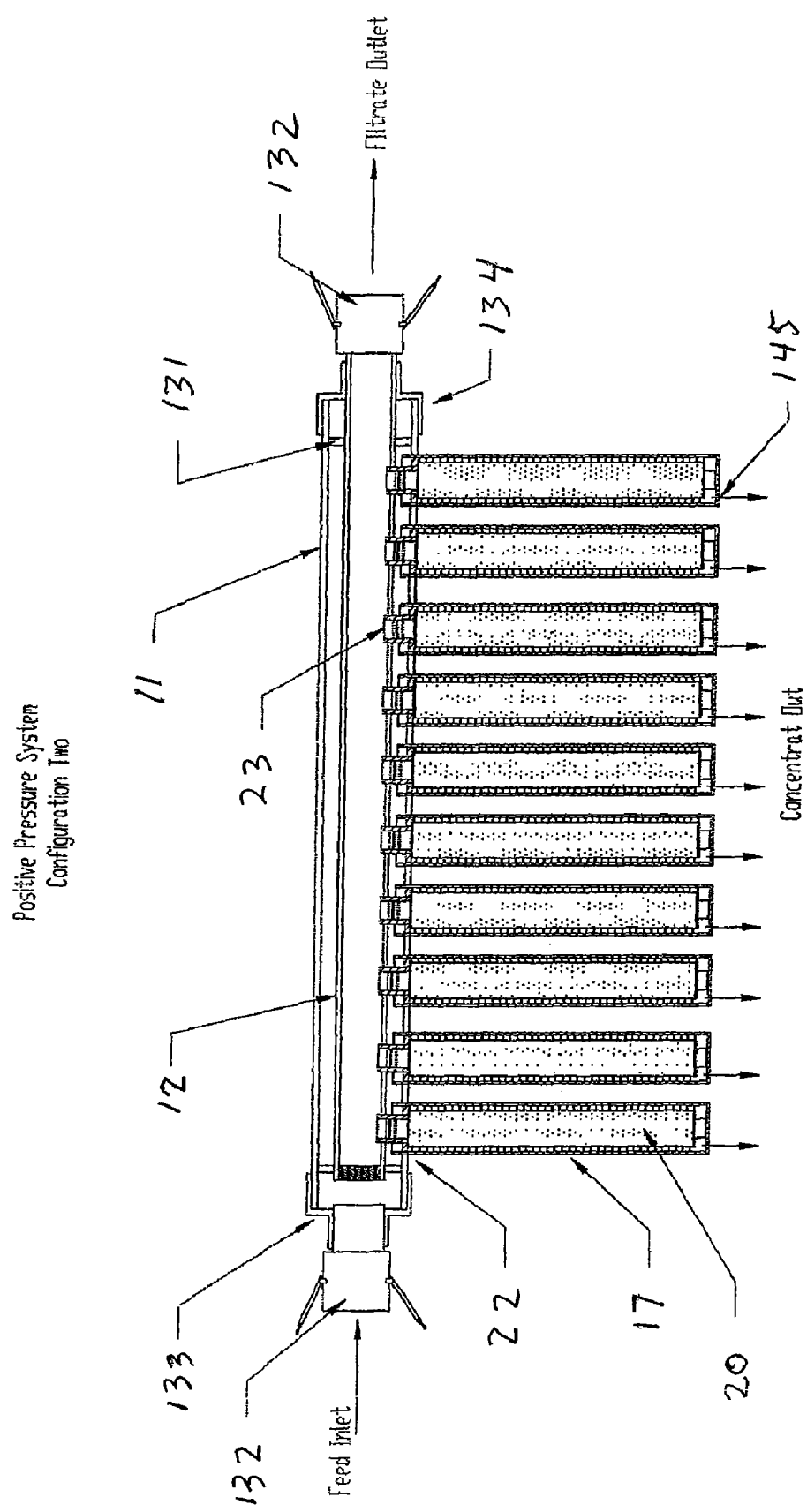
FIG. 14 is a side view illustration of another positive pressure filter system in accordance with the present invention.

FIG. 13 illustrates a generally closed, positive pressure subsystem. In comparison, FIG. 14 illustrates an open-ended, positive pressure subsystem wherein feed liquid to be filtered is introduced into concentrate manifold 11, concentrate flows out of outlets 145 at lower ends of filter housings 17, and filtrate flows out of the filtrate outlet of permeate manifold 12. As in the subsystem of FIG. 13, fluid flow through the subsystem of FIG. 14 can be controlled by adjusting the pressures within manifolds 11, 12 and the pressure at concentrate outlet 145.

Figure 15:
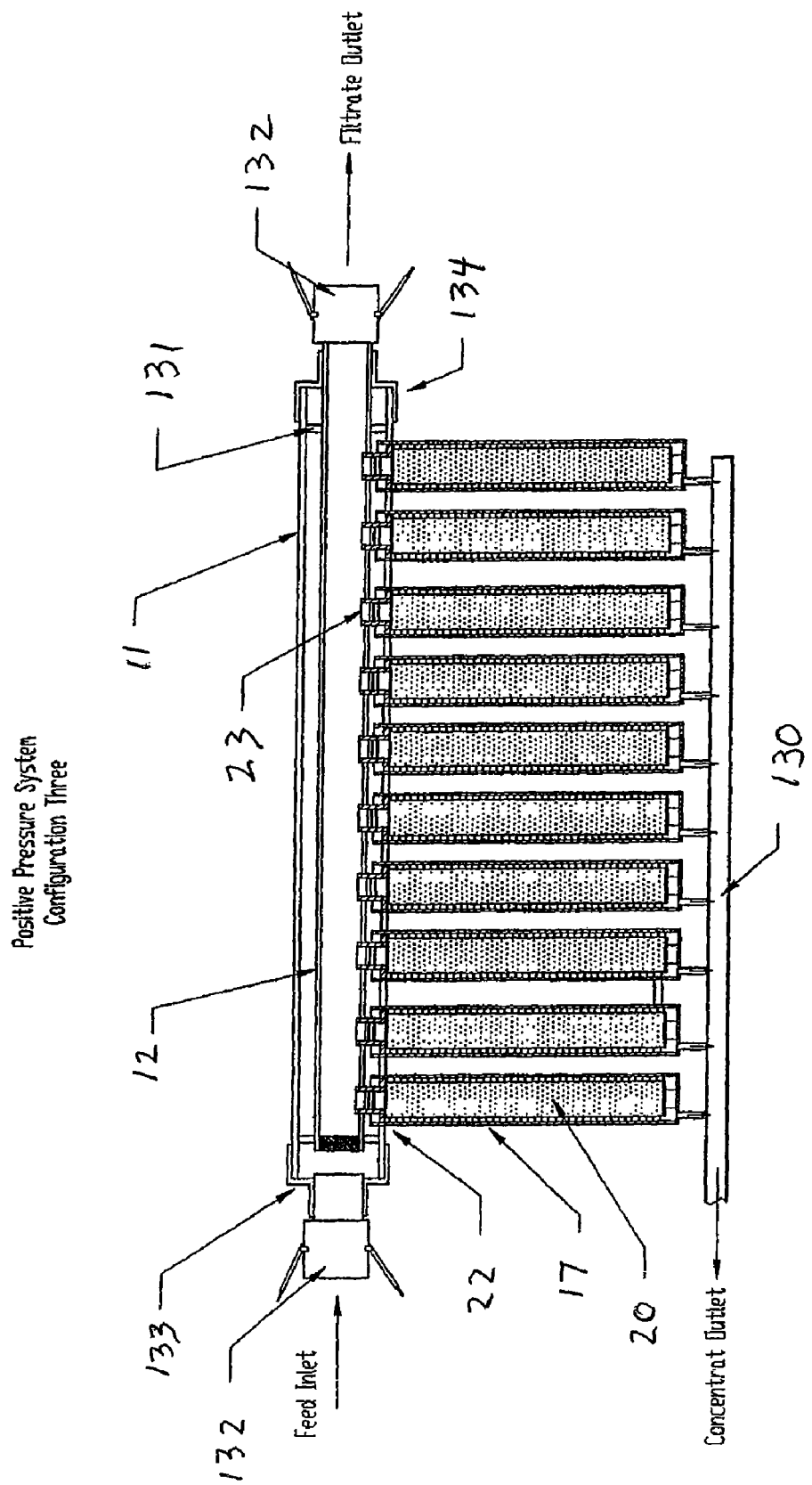
FIG. 15 is a side view illustration of another positive pressure filter system in accordance with the present invention.

FIG. 15 illustrates another embodiment of a closed positive pressure subsystem. While the structure of the embodiment of FIG. 15 is identical to the structure of FIG. 13, the pressures within manifolds 11, 12 and 130 are different. In the embodiment of FIG. 15, the feed liquid to be filtered is introduced into concentrate manifold 11, the filtrate flows through permeate manifold 12, and the concentrate flows into manifold 130. This illustrates the concept that fluid flow through a subsystem may be changed, while still providing a filtrate and concentrate from a feed liquid.

Figure 16:
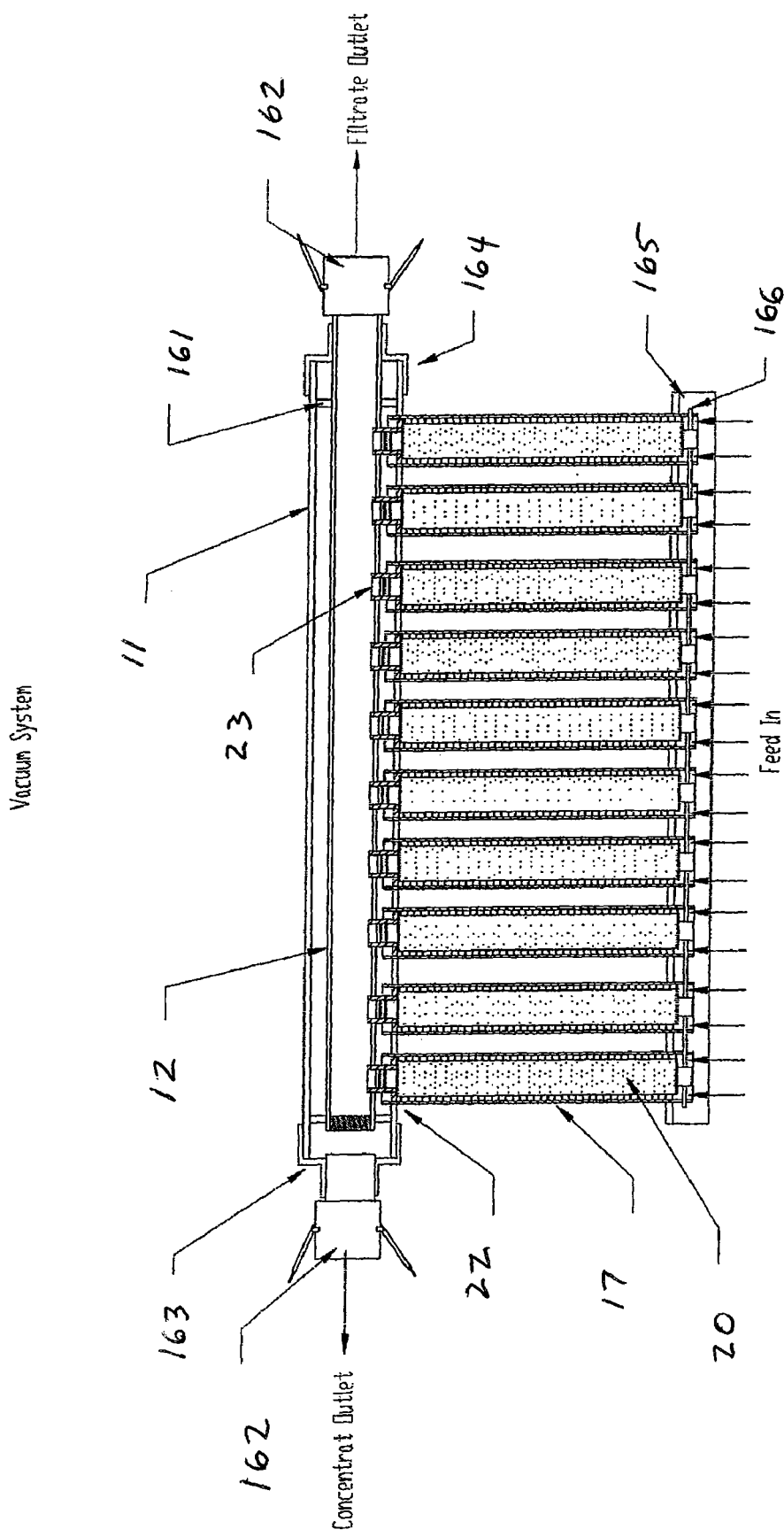
FIG. 16 is a side view illustration of a negative pressure filter system in accordance with the present invention.

FIG. 16 illustrates a negative pressure or "vacuum" embodiment of a filter subsystem. In this embodiment, feed liquid drawn into openings a lower ends of filter housings 17, filtrate exits permeate manifold 12, concentrate exits concentrate manifold 12. In this embodiment, filter housings 17 are supported by filter frame 165. Pin 166 is used to secured filter housings 17 to frame 165.

Figures 17, 18:
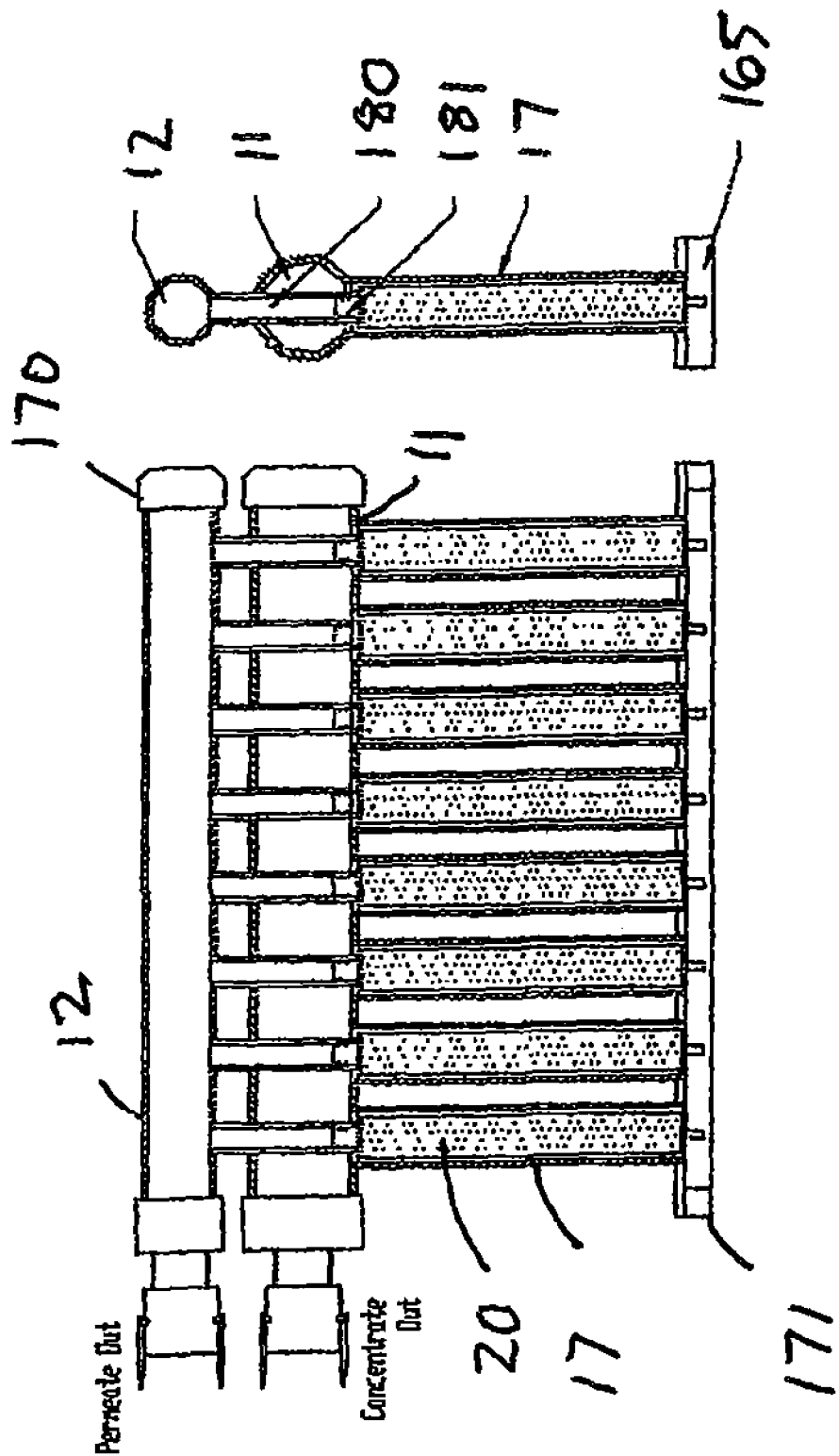
FIGS. 17 and 18 are side view illustrations of another embodiment of a filter system in accordance with the present invention.

FIG. 16 illustrates a concentric manifold version of a filtration subsystem wherein manifolds 11, 12 are generally concentrically aligned. In comparison, FIGS. 17 and 18 illustrate a non-concentric manifold version, wherein manifolds 11, 12 are generally parallel, but non-concentrically aligned. As shown in FIG. 18, a plurality of permeate reception adapters 180 pass through concentrate manifold 11. Adapters 18 are sealed by o-rings 181 and adhesives in order to prevent cross-contamination between permeate fluid and concentrate fluid.

Figure 19:
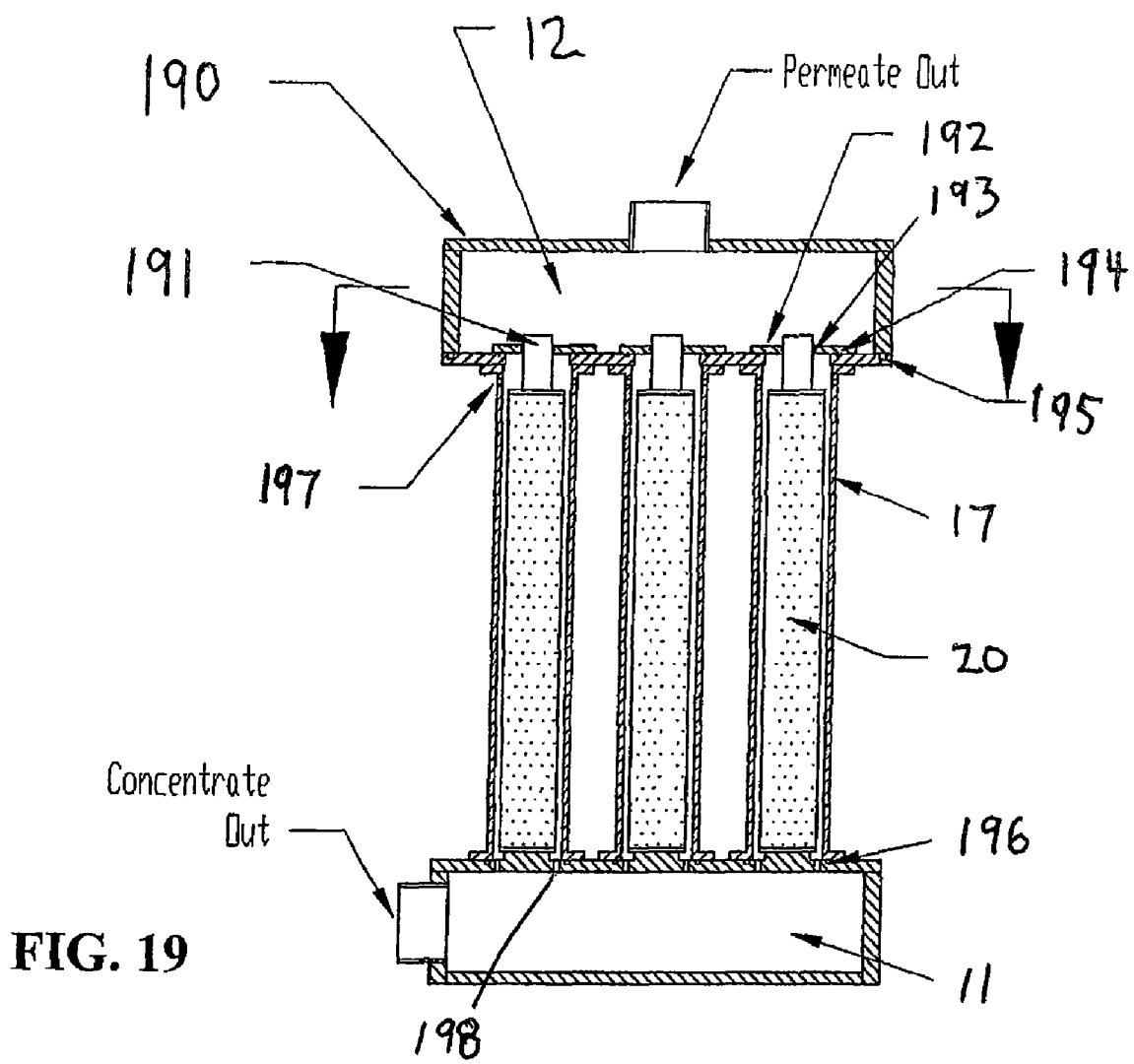
FIG. 19 is a side view illustration of another embodiment of a filter system in accordance with the present invention.
Figure 20:
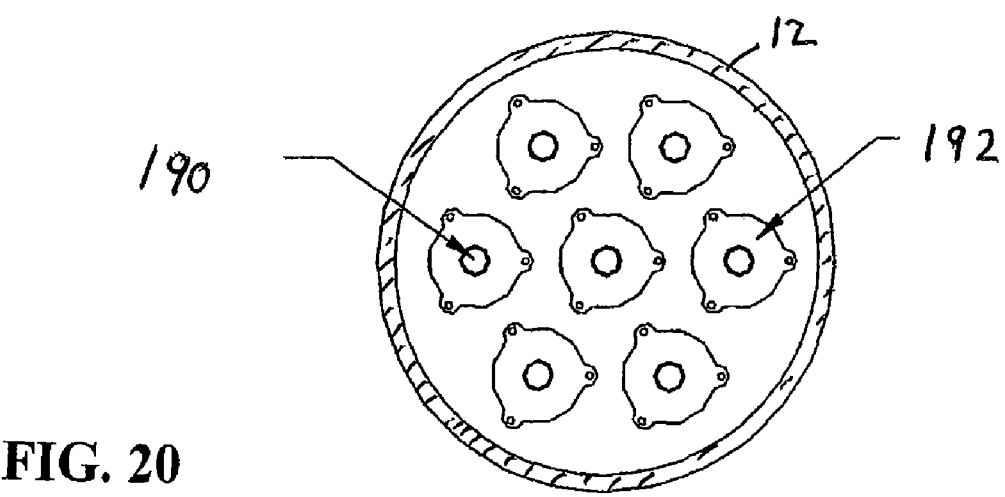
FIG. 20 is a top view of the embodiment of FIG. 19.

The filtration subsystems of FIGS. 14-18 illustrate generally linearly aligned filter housings 17. In comparison, FIGS. 19 and 20 illustrate a filtration subsystem wherein the filter housings 17 are concentric. Permeate manifold 12 includes a removable cover 190 defining a permeate outlet and a plurality of permeate drain tubes 191 providing fluid communication between manifold 12 and the interior of filter cartridges 20. Tubes 191 are sealed with seal cap 192, seal ring 193 and seal ring 194. Permeate manifold 12 is coupled to one end of filter housing 17 and concentrate manifold 11 is coupled to the other end of filter housing 17. Seal rings 196 are used to seal concentrate manifold 11 to filter housing 17. Filter housings 17 include a plurality of feed inlet apertures 197 through which feed liquid is introduced into the subsystem. Concentrate passes into concentrate manifold via a plurality of passageways 198. The embodiment of FIGS. 19 and 20 illustrate yet another feed liquid introduction into filter housings 17.

Figure 21:
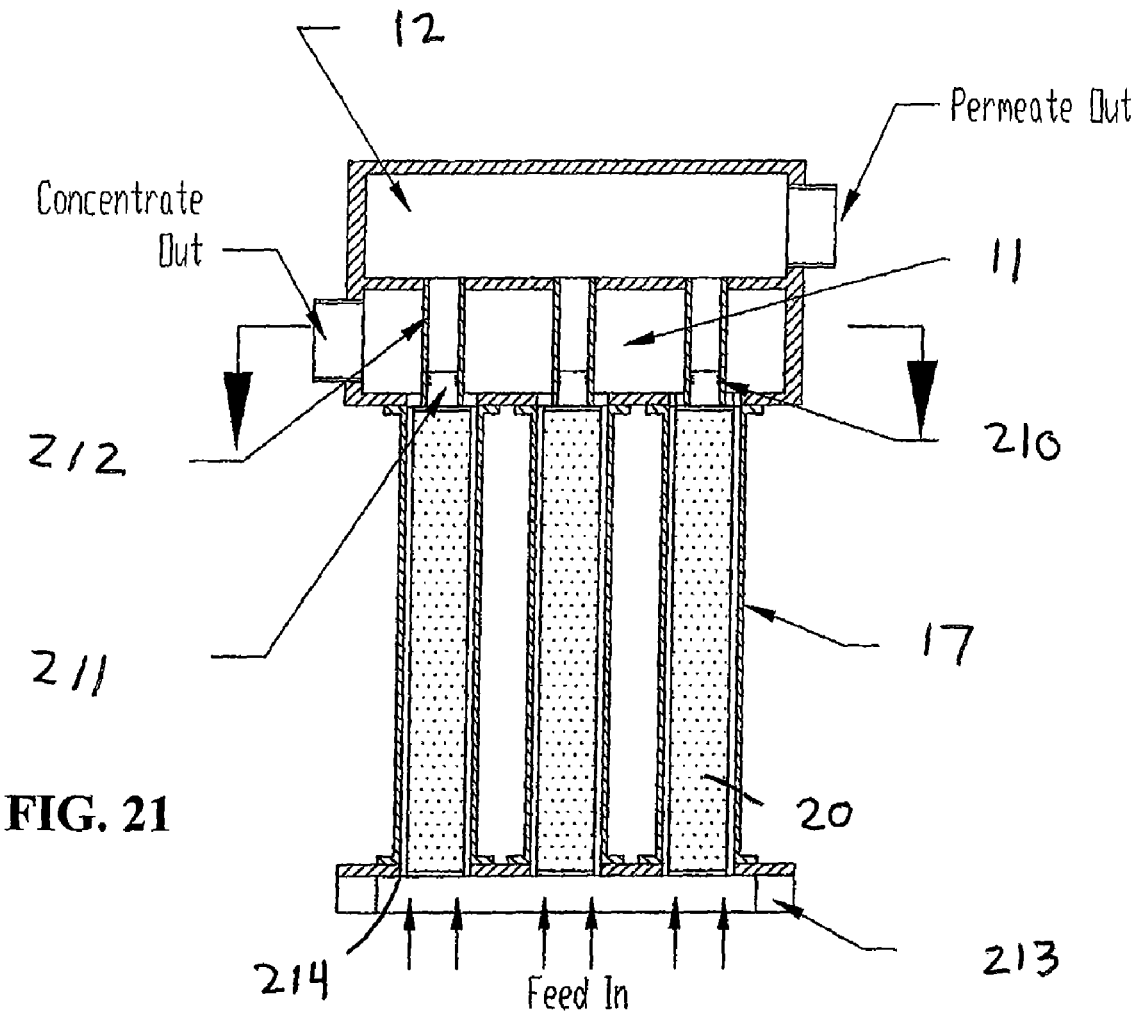
FIG. 21 is a side view illustration of another embodiment of a filter system in accordance with the present invention.
Figure 22:
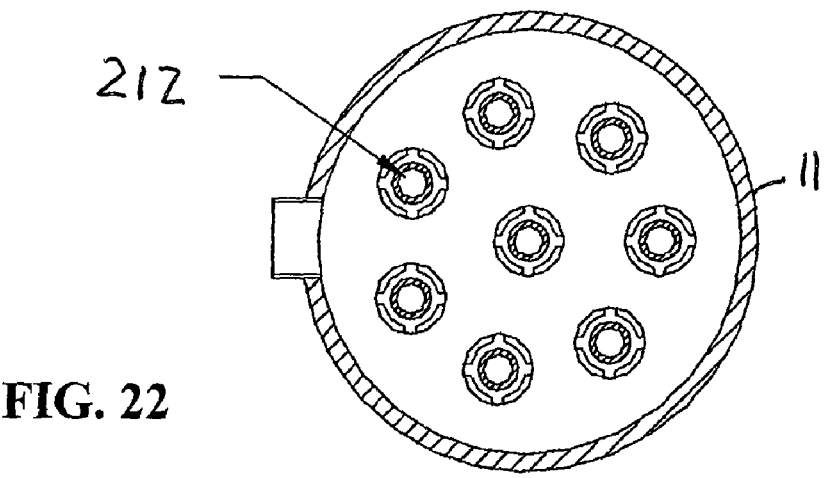
FIG. 22 is a top view of the embodiment of FIG. 20.
Figure 23:
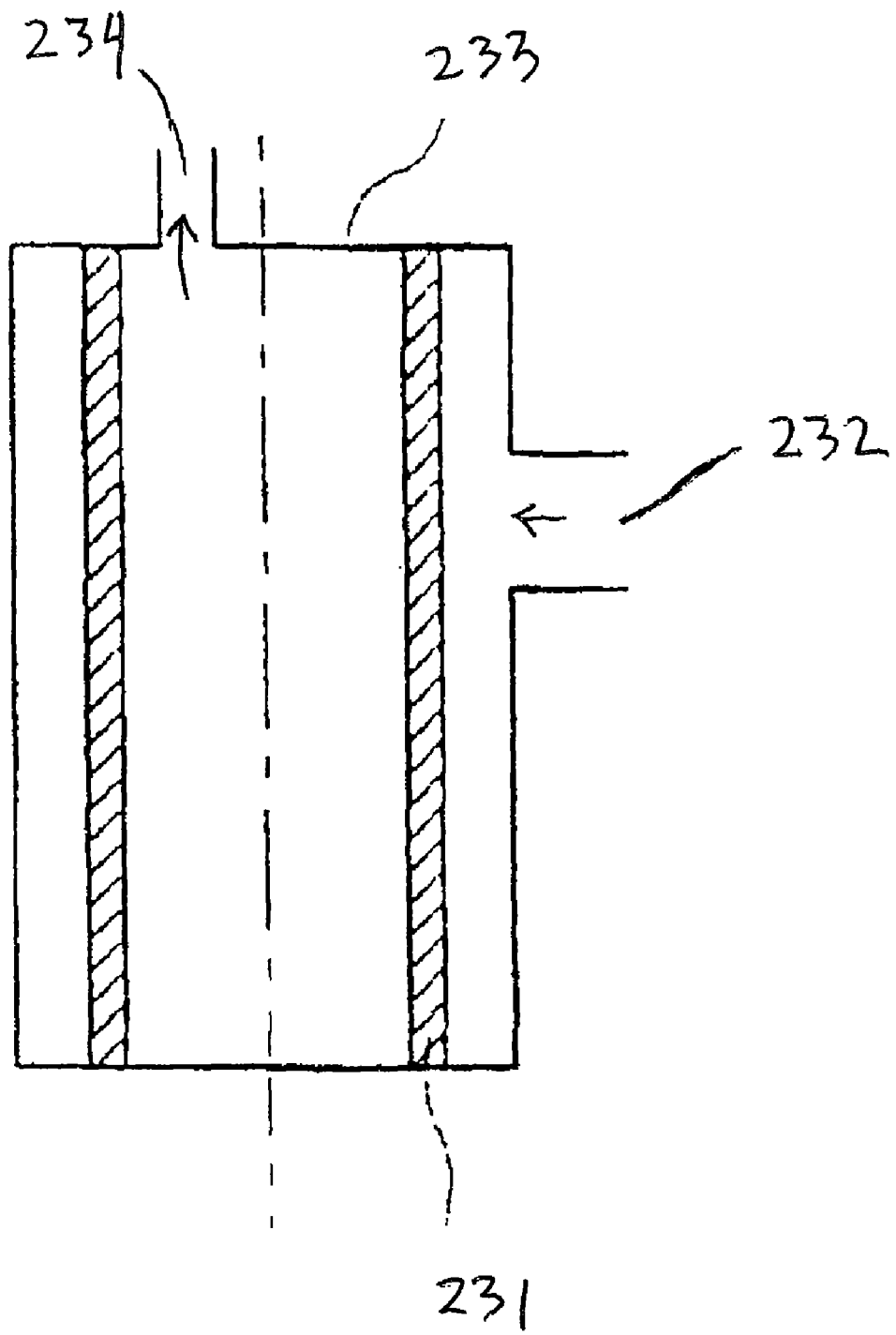
FIG. 23 is a cross section illustration depicting a filter assembly of the prior art.
Figure 24:
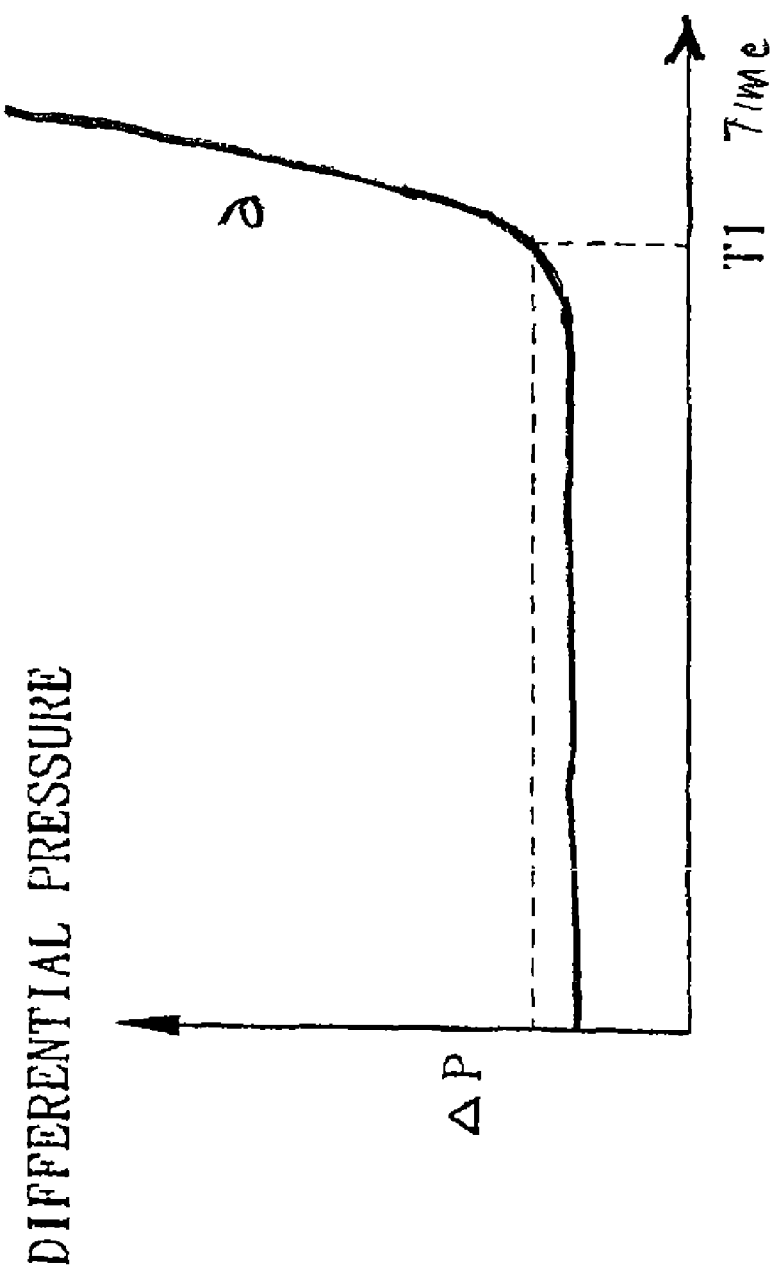
FIG. 24 is a graph displaying differential pressure versus time for operation of a filter assembly, such as that of FIG. 23.
Figure 25:
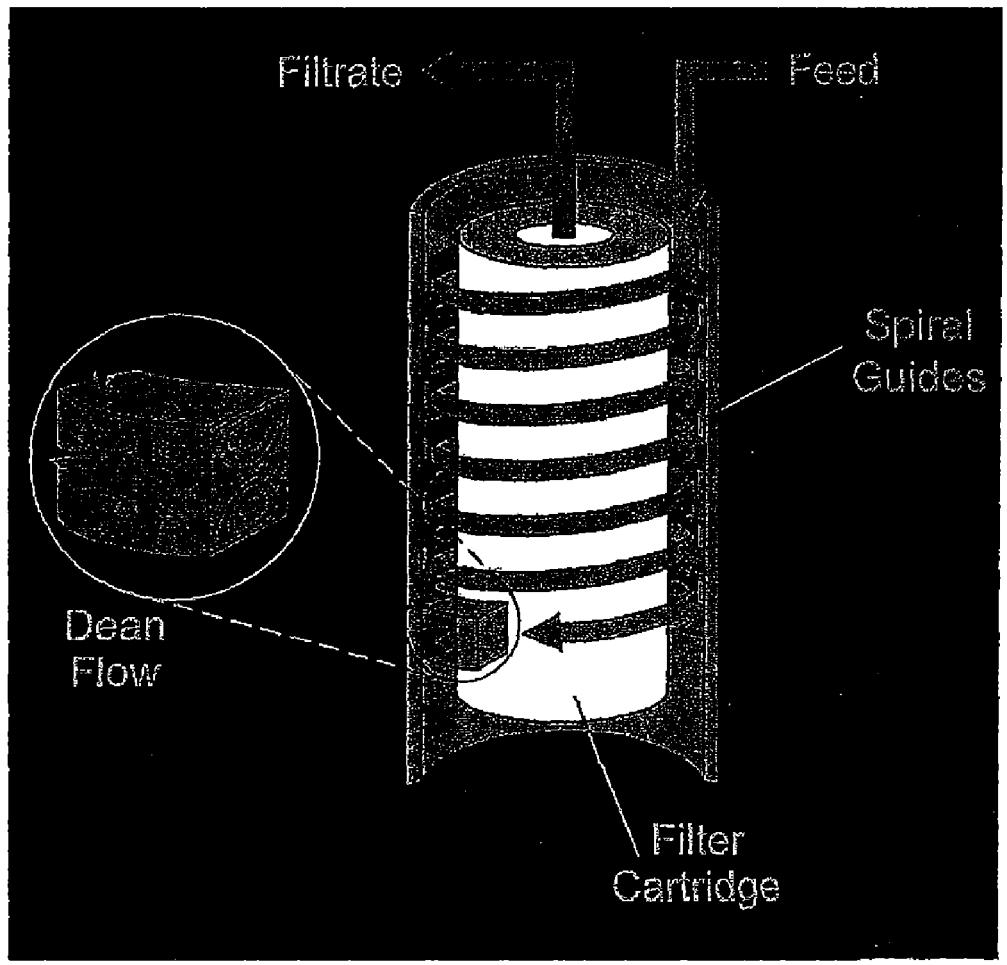
FIG. 25 is a illustration depicting formation of Dean-flow currents around a filter.

FIGS. 21 and 22 illustrate another concentric filtration subsystem. Filter housings 17 are coupled at one end to both permeate manifold 12 and concentrate manifold 11. A plurality of seal rings 210 are used to seal permeate drain tube 211 to permeate reception adapter 212. A frame 213 is used to support housings 17. Feed liquid is introduced into filter housings 17 via passageways 214.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A filter system comprising:
a plurality of filter housings, each filter housing defining a housing cavity;
a plurality of filter cartridges received within the plurality of housing cavities, said filter cartridges defining an elongate permeate passageway, said permeate passageway being in fluid communication with a permeate manifold;
a plurality of spiral guides extending around an outer filter cartridge surface, wherein each said spiral guide imparts secondary flow across said outer filter surface and perpendicular to a fluid flowing through said spiral guides; and
a concentrate manifold being in fluid communication with said spiral guides, said concentrate manifold receiving concentrate passing through said spiral guides, wherein said permeate manifold and said concentrate manifold each include elongated, generally cylindrical cavities, and wherein said permeate manifold and said concentrate manifold are generally parallel to each other and are generally concentrically aligned.

2. The filter system of claim 1 further comprising a plurality of passageways providing fluid communication between the concentrate manifold and the spiral guides.

3. The filter system of claim 2 wherein the permeate manifold and concentrate manifold each define elongated, generally cylindrical cavities.

4. The filter system of claim 1 wherein said spiral guides define a cross-sectional area for fluid flow which, for the velocity of the fluid flow therethrough, induces Dean-Flow currents in the fluid following through said spiral guides.

5. A filter system comprising:
a plurality of filter housings, each filter housing defining a housing cavity;
a plurality of filter cartridges received within the plurality of housing cavities, said filter cartridges defining an elongate permeate passageway, said permeate passageway being in fluid communication with a permeate manifold;

a plurality of spiral guides extending around an outer filter cartridge surface, wherein each said spiral guide imparts secondary flow across said outer filter surface and perpendicular to a fluid flowing through said spiral guides;

a concentrate manifold being in fluid communication with said spiral guides, said concentrate manifold receiving concentrate passing through said spiral guides; and an apertured cap through which fluid flows prior to introduction into the spiral guides, said cap providing initial filtering of said fluid.

6. The filter system of claim 5 wherein the cap is mounted at an end of the filter housing opposite the concentrate manifold.

7. The filter system of claim 6 wherein the caps are secured to ends of the filter cartridges.

8. The filter system of claim 7 wherein the caps each include a non-porous portion which prevents fluid access into the permeate passageways and a filter portion which provides initial filtering of said liquid.

9. A filter system comprising:
a plurality of filter housings, each filter housing defining a housing cavity;
a plurality of filter cartridges received within the plurality of housing cavities, said filter cartridges defining an elongate permeate passageway, said permeate passageway being in fluid communication with a permeate manifold, wherein the filter cartridges include a plurality of fluid flow resistors within the permeate passageways sized to equalize a pressure differential across a filter media along a length of the filter cartridge;
plurality of spiral guides extending around an outer filter cartridge surface, wherein each said spiral guide imparts secondary flow across said outer filter surface and perpendicular to a fluid flowing through said spiral guides; and
a concentrate manifold being in fluid communication with said spiral guides, said concentrate manifold receiving concentrate passing through said spiral guides.

10. A filter system comprising:
a concentrate manifold;
a permeate manifold being generally linearly aligned relative to the concentrate manifold;
a plurality of filter housings, each filter housing having a spiral guide extending toward a housing center, and said filter housings being generally linearly aligned relative to the concentrate manifold; and
a plurality of filter cartridges, each cartridge being mounted within one of the plurality of filter housings and positioned proximate to the spiral guide, wherein the filter housings and cartridges extend upwardly from the concentrate manifold, and wherein feed liquid is drawn into the filter housings through multiple apertures.

11. The filter system of claim 10 wherein passageways provide fluid communication between the concentrate manifold and the filter housings.

12. The filter system of claim 10 wherein the multiple apertures are defined caps secured at ends of filter housings.

13. The filter system of claim 12 wherein the caps are secured to the filter cartridges.

14. The filter system of claim 10 wherein said spiral guides define a cross-sectional area for fluid flow which, for the velocity of the fluid flow therethrough, induces Dean-Flow currents in the fluid flowing through said spiral guides.

15. A filter system comprising:
a plurality of filter assemblies, each assembly including an elongate filter housing having an interior cavity, an elongate filter cartridge within the cavity, and a spiral guide spanning within the cavity, said spiral guide defining a spiral fluid passageway extending along a length of the cartridge, said filter housing having a first open end in fluid communication with a feed fluid and a second end coupled to a permeate manifold and a concentrate manifold, with said permeate manifold and said concentrate manifold being generally cylindrical and concentrically aligned.

16. The filter system of claim 15 wherein said permeate manifold extends within said concentrate manifold, with passageways extending through the concentrate manifold to provide fluid communication between the permeate manifold and an interior passageway of the filter cartridge.

17. The filter system of claim 15 wherein each filter cartridge includes a coupling at one end and a non-porous cap at the other end, said coupling preventing cross-contamination between permeate and concentrate.

18. The filter system of claim 17 wherein the filter cartridges are connected to an apertured cap allowing feed water to pass therethrough and into the spiral fluid passageway.

19. The filter system of claim 17 wherein the apertured cap is secured at an end of the filter housing.

20. The filter system of claim 17 wherein the filter cartridges include a plurality of fluid flow resistors for modifying a pressure differential across a filter media of the filter cartridge.

21. The filter system of claim 15 wherein the spiral fluid passageway is of a dimension so as to impart Dean-Flow currents to fluid flowing therethrough, the Dean-Flow currents providing a secondary flow across an outer surface of the filter cartridge.

22. A filter system comprising:
a plurality of filter cartridges inserted into a plurality of filter housings, each of said filter housings being in fluid communication with a feed fluid, and said filter cartridge includes an interior passageway in fluid communication with a permeate manifold, and a spiral passageway extends within the filter housing between an opening to the feed fluid and a passageway in fluid communication with a concentrate manifold, and wherein the filter cartridge includes an elongated filter media and having a plurality of fluid flow resistors within the interior passageway, said flow resistors equalizing a flow of fluid within the spiral passageway through the filter media.

23. The filter system of claim 22 further comprising an apertured cap secured at one end of the filter housing, with said feed fluid passing through and being filtered by the aperture cap.

24. The filter system of claim 23 wherein the apertured cap is secured to one end of the filter cartridge.

25. The filter system of claim 22 wherein the spiral passageway is defined by a spiral wall within the filter housing.

26. The filter system of claim 22 wherein the spiral passageway is defined by a spiral grove upon an exterior surface of the filter cartridge.

27. A filter system comprising:
a plurality of filter cartridges inserted into a plurality of filter housings, each of said filter housings being in fluid communication with a feed fluid, and said filter cartridge includes an interior passageway in fluid communication with a permeate manifold, and a spiral passageway extends within the filter housing between an opening to the feed fluid and a passageway in fluid communication with a concentrate manifold, and wherein the filter cartridge includes an elongated filter media and having an apertured cap at one end and an adapter on an opposed end, said adapter providing a fluid passageway between an interior of the filter cartridge and a permeate manifold.

28. The filter system of claim 27 wherein said adapter further includes a sealing means for minimizing cross-contamination between a concentrate manifold and the permeate manifold.

* * * * *